United States Patent
Krebs et al.

(10) Patent No.: US 7,174,179 B2
(45) Date of Patent: Feb. 6, 2007

(54) METHODS AND APPARATUS FOR MITIGATING RAIN FADING OVER SATCOM LINKS VIA INFORMATION THROUGHPUT ADAPTATION

(75) Inventors: Lawrence W. Krebs, Purcellville, VA (US); Robert J. Sims, Reston, VA (US); Ronald C. Bruno, Arlington, VA (US); Christopher Jason Berger, Arlington, VA (US); Ronald H. Pawlikowski, Jr., Arlington, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 593 days.

(21) Appl. No.: 10/214,308

(22) Filed: Aug. 8, 2002

(65) Prior Publication Data

US 2003/0054816 A1 Mar. 20, 2003

Related U.S. Application Data

(60) Provisional application No. 60/323,321, filed on Sep. 20, 2001.

(51) Int. Cl.
*H04B 7/01* (2006.01)
(52) U.S. Cl. ............... 455/504; 455/3.02; 375/298
(58) Field of Classification Search ........... 455/427, 455/428, 12.1, 15, 3.02, 249.1, 52.2, 10, 455/504, 42, 501, 102, 115.3, 127.2; 370/338, 370/349; 375/298, 225, 241, 261
See application file for complete search history.

(56) References Cited

U.S. PATENT DOCUMENTS

| | | | |
|---|---|---|---|
| 4,495,619 A | 1/1985 | Acampora | |
| 4,837,786 A | 6/1989 | Gurantz et al. | |
| 5,541,955 A | 7/1996 | Jacobsmeyer | |
| 5,974,032 A | 10/1999 | Snowden et al. | |
| 5,982,813 A | 11/1999 | Dutta et al. | |
| 6,084,919 A | 7/2000 | Chuprun et al. | |
| 6,201,786 B1 | 3/2001 | Zscheile, Jr. et al. | |
| 6,212,201 B1 | 4/2001 | Hinderks et al. | |

(Continued)

FOREIGN PATENT DOCUMENTS

EP 0 904 639 B1 3/1999

(Continued)

*Primary Examiner*—Edward F. Urban
*Assistant Examiner*—Tu X. Nguyen
(74) *Attorney, Agent, or Firm*—Edell, Shapiro & Finnan, LLC

(57) ABSTRACT

A remote communications terminal accesses a terrestrial network or information source via a SATCOM link with an earth station hub linked to the network or information source. Information throughput adaptation (ITA) is employed on the SATCOM link to maximize information throughput over the SATCOM link while ensuring acceptable signal quality under varying rain fading conditions. Sufficient power margin is built into the SATCOM link such that, under severe rain fading conditions, the lowest system throughput rate still provides acceptable signal quality. Under lesser rain fading conditions, the data throughput rate is increased via more bandwidth efficient modulation and coding schemes permitted by the higher signal quality which results from greater power margin. The earth station hub and remote terminals monitor the signal quality and communicate to adaptively adjust the modulation and coding used on the forward and return links to maximize information throughput under varying rain fading conditions.

72 Claims, 10 Drawing Sheets

U.S. PATENT DOCUMENTS

| | | | |
|---|---|---|---|
| 6,215,793 B1 | 4/2001 | Gultekin et al. | |
| 6,272,340 B1 * | 8/2001 | Wright et al. | 455/427 |
| 6,330,278 B1 * | 12/2001 | Masters et al. | 375/223 |
| 6,665,285 B1 * | 12/2003 | Treadaway et al. | 370/338 |
| 6,714,551 B1 * | 3/2004 | Le-Ngoc | 370/401 |
| 2002/0058505 A1 * | 5/2002 | Kim et al. | 455/427 |

FOREIGN PATENT DOCUMENTS

| | | |
|---|---|---|
| EP | 0 998 069 A2 | 5/2000 |
| EP | 1 130 837 A | 9/2001 |
| WO | WO 01/13540 A2 | 2/2001 |

* cited by examiner

METHODS AND APPARATUS FOR MITIGATING RAIN FADING OVER SATCOM LINKS VIA INFORMATION THROUGHPUT ADAPTATION

CROSS REFERENCE TO RELATED APPLICATION

This application claims priority from U.S. Provisional Patent Application Ser. No. 60/323,321, entitled "Broadband Satellite Communications System," filed Sep. 20, 2001. The disclosure of this provisional patent application is incorporated herein by reference in its entirety.

BACKGROUND OF THE INVENTION

1. Field of the Invention

The present invention relates to methods and apparatus for mitigating rain fading over satellite communications (SATCOM) links using information throughput adaptation and, more particularly, to techniques for maximizing information throughput while maintaining acceptable SATCOM link fade margins under varying rain fade conditions over a plurality of communications links.

2. Description of the Related Art

As terrestrial communications systems and satellite communications systems evolve, certain trends present an opportunity to combine terrestrial and satellite infrastructures into broadband communications systems that take advantage of these evolutions to provide enhanced capabilities and performance.

With regard to terrestrial communications, terrestrial infrastructures are evolving from a circuit-switched architecture, such as that used in conventional voice telephone circuits, to a packet-switched, shared-media architecture. Packetized communications networks typically format data into packets for transmission from one site to another. In particular, the data is partitioned into separate packets at a transmission site, wherein the packets usually include headers containing information relating to packet data and routing. The packets are transmitted to a destination site in accordance with any of several data transmission protocols, such as Asynchronous Transfer Mode (ATM), Frame Relay, High Level Data Link Control (HDLC), X.25, IP, etc.), by which the transmitted data is restored from the packets received at the destination site.

Packetized data communications are appealing for common carrier or time-shared switching systems, since a packet transmission path or circuit is unavailable only during the time when a packet utilizes the circuit for transmission to the destination site, thereby permitting other users to utilize that same circuit when the circuit becomes available. Each individual transmission circuit and access channel connecting an end user to the packet switching network has a maximum data carrying capacity or bandwidth that is shared among the various users of the network. The access channel utilization is typically measured as an aggregate of the individual circuit utilizations and has a fixed bandwidth, while the individual circuits may be utilized by several users wherein each user may utilize an allocated portion of the circuit.

When a party needs to send and receive data over distances, the party (end user) enters into a service level agreement with a service provider to provide access to a data communications network. Depending on an individual end user's needs, the service level agreement may include provisions that guarantee certain minimum performance requirements that the service provider must meet. For example, if the end user expects to send and receive a certain amount of data on a regular basis, the end user may want the service provider to guarantee that a certain minimum bandwidth will be available to the end user at all times. The end user may want the service provider to guarantee that the average or minimum ratio of data units delivered by the network to data units offered to the network at the far-end is above a certain percentage and/or that the average or maximum transmission delays will not exceed a certain duration.

From a service provider's perspective, it is competitively advantageous to be able to demonstrate to potential and existing end users that the service provider is capable of meeting such network performance metrics. Thus, the capability to provide Quality of Service (QoS) analysis of network system performance at the service level, particularly in the context of network systems that share bandwidth between sites, is desirable from both an end user and service provider standpoint. Packet-switched architectures are evolving to support quality of service provisioning and the service level agreements which define the system performance requirements on a customer-by-customer basis.

Further, because of packet switching and new digital technology, there is no longer a need to have separate circuits for voice, data, and video, and it is foreseeable that delivery of several such forms of information will converge to "multimedia" being delivered on a common network over a single "pipe". Moreover, parallels between commercial and military system requirements suggest that military and commercial infrastructures are also converging. For example, military tactical situations, such as delivering high speed data to a warfighter, require solutions analogous to those required in commercial contexts, such as business to consumer transactions.

As traditional circuit-switched communications systems transition to a "network-centric" architecture based on packet-switching, satellite communications (SATCOM) systems will likely be required to support such architectures and will be expected to support the end-to-end provisioning of services based on Quality of Service (QoS) metrics and customer Service Level Agreements (SLAs). Concurrent with this transformation of the terrestrial infrastructure is the evolution of SATCOM infrastructure to Ka-band frequencies. At Ka-band frequencies, the required antenna size is smaller than at lower frequencies, while more bandwidth is available to deliver more bits per second. In effect, the greater bandwidth and smaller antenna at Ka-band provides bigger "pipes" to smaller aperture antennas.

In terms of where commercial satellite communications are likely headed, the low-earth-orbiting (LEO) and medium-earth-orbiting (MSS) programs such as Iridium and Globalstar which were oriented toward the mobile satellite services have not been successful, which may impact rollout strategies for anticipated high speed data LEOs. On the other hand, broadband data trunking over geostationary (GEO) satellites exists today and is growing. The anticipated latency problems of TCP/IP (transmission control protocol/internet protocol) over satellite have been dealt with, and new bandwidth-efficient modulation techniques allow more bits/second to be delivered over the same frequencies. Thus, geostationary satellites using bandwidth efficient modulation at Ka-band present an opportunity to realize broadband over satellite communications.

While Ka-band offers a substantial increase in bandwidth, Ka-band carries a signal attenuation penalty associated with rain and other precipitation due to the inherent signal absorption characteristics of water at these frequencies. The current method for maintaining acceptable link performance in the face of rain-induced attenuation is a combination of large static power margins (i.e., putting enough power margin in the link in the first place so that sufficient power is received even during a rain event) and adaptive link power control (i.e., adaptively raising the power of the link in response to rain). Each of these approaches has drawbacks. The maintenance of large static power margins is not efficient, and adaptive link power control algorithms developed for X-band SATCOM may not be easily extensible to operation at the higher frequencies to which SATCOM is evolving (e.g., Wideband Gapfiller at Ka-band). Adaptive link power control requires an additional control system overlaid on the communications system to control the power level on a link-by-link basis. Such a link power adjustment control system is relatively complex and expensive and would be undesirable in a commercial communications system to mitigate downlink rain fades, where thousands or millions of customers may be covered by a satellite's footprint, each of which would require a corresponding power control link.

Thus, there remains a need for a seamless interconnection between terrestrial communications infrastructure and the satellite communications transport segment to support Broadband/Packet-switched communications (e.g., IP, TCP/IP, ATM) over geostationary satellite communications. In particular, there remains a need for a system which integrates with terrestrial infrastructures operating from service level agreements based on quality of service, and which provides high speed links adaptable to changing propagation effects that occur at Ka-band without requiring a complex control system overlay to provision services and manage performance.

SUMMARY OF THE INVENTION

Therefore, in light of the above, and for other reasons that become apparent when the invention is fully described, an object of the present invention is to maximize information throughput over satellite communications links while maintaining signal quality under varying signal attenuation conditions.

A further object of the present invention is to employ information throughput adaptation to take advantage of static power margin present in a satellite communications link to increase information throughput during periods of lesser signal attenuation.

Yet a further object of the present invention is to maintain a constant envelope of power and bandwidth at the interface to the communications satellite, thereby avoiding the need for system-level power control which might otherwise be necessary with a shared-resource satellite whose use is allocated among many users.

A still further object of the present invention is to maintain a constant RF signature (i.e., a constant envelope of power, bandwidth and frequency) over a satellite communications link while permitting the modulation and error correction coding of the RF signal to vary.

Another object of the present invention is to seamlessly interconnect terrestrial communications infrastructures with the satellite communications transport segments to support Broadband, Packet-switched over satellite communications.

Yet another object of the present invention is to provide a system which integrates with terrestrial infrastructures operating from service level agreements specifying user-based quality of service.

Still another object of the present invention is to provide high speed links adaptable to changing propagation effects that occur at Ka-band without requiring a complex control system overlay to provision services and manage performance.

It is a further object of the present invention to provision service based on the service level agreement relating to the application requesting the service.

It is yet a further object of the present invention to support both commercial and military satellite communications involving a plurality of users sharing a common satellite resource such as a satellite transponder.

It is another object of the present invention to account for the relative priority of various users, such as may be reflected in service level agreements, in determining the manner in which information throughput adaptation is implemented.

It is yet another object of the present invention to support Ka-band and Ku-band as well as other high-frequency satellite communications while addressing the signal attenuation issues associated therewith.

It is still another object of the present invention to avoid saturation of a satellite transponder simultaneously supporting a plurality of users.

The aforesaid objects are achieved individually and in combination, and it is not intended that the present invention be construed as requiring two or more of the objects to be combined unless expressly required by the claims attached hereto.

The system of the present invention involves a satellite communications (SATCOM) link that uses bandwidth efficient modulation and coding capable of adaptively adjusting the data rate via the modulation and error correction coding schemes in response to rain fade conditions to maximize information throughput over the SATCOM link while ensuring acceptable signal quality. In an exemplary embodiment, a remote terminal is provided communications access to a wide area network or other terrestrial network or information source via a SATCOM link with an earth station hub which is linked to the network or information source. Sufficient power margin is built into the SATCOM link such that, under severe rain fading conditions, the lowest system throughput rate still provides acceptable signal quality. Under lesser or minimal rain fading conditions, the data throughput rate is increased via more bandwidth efficient modulation and coding schemes permitted by the higher signal quality which results from the greater power margin. The earth station hub and remote terminals monitor the signal quality of arriving signals and communicate to adaptively adjust the modulation and coding used on the forward and return links to maximize information throughput under varying fade conditions.

Preferably, the RF spectrum of the SATCOM signal does not change as the information throughput is adjusted; consequently, information throughput adaptation control can be implemented by a simple dialog between the earth station hub and remote terminals, thereby avoiding complex control systems that monitor and control overall power utilization of the entire satellite or transponder. Specifically, the power, bandwidth and frequency remain constant, while the bandwidth efficient modulation and coding scheme is adjusted to change the information throughput rate and account for signal-to-noise reductions caused by rain fading. The information throughput adaptation (ITA) of the present invention can be performed autonomously on a link-by-link basis without the need of an overlaid control system.

The ITA system of the present invention provides both a complete solution for the QoS-based establishment and transmission of broadband communications over SATCOM. The system includes bandwidth efficient modulation that can dynamically adapt to changes in the RF propagation environment and baseband interface processing and switching to support seamless interface with terrestrial infrastructure based on any one or combination of protocols including, but not limited to: IP, ATM, Frame Relay, and Streaming Data protocols. The data rates are consistent with the terrestrial infrastructure and resource management in a way that takes advantage of the QoS strategy for managing traffic. ITA is readily implemented in the context of a network-centric architecture based on packet switching and supports end-to-end QoS that can provide a desired information rate at an availability tailored to the criticality of the information.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED

EMBODIMENTS

Figure 1:
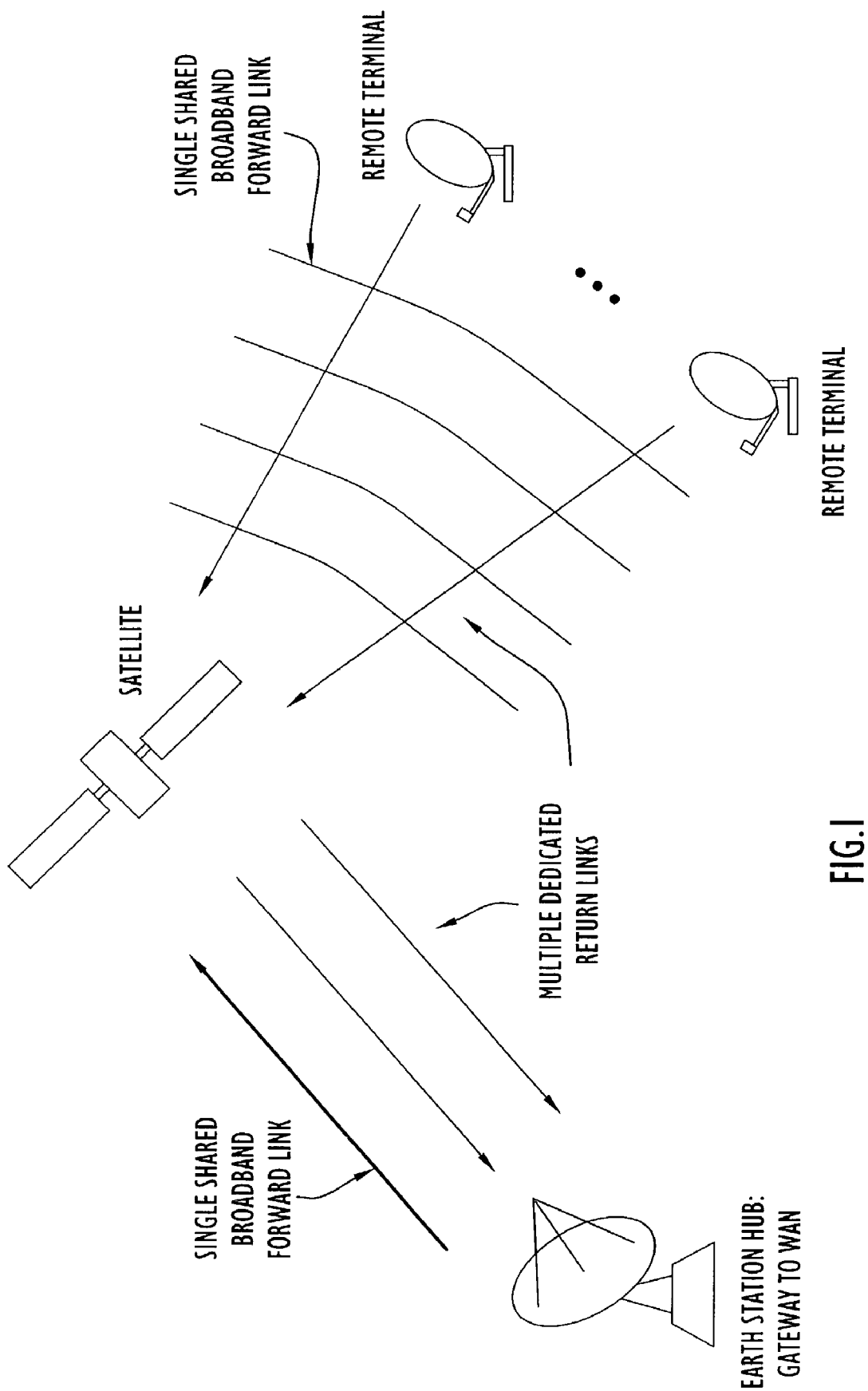
FIG. 1 is a conceptual representation of a satellite communications scenario to which the information throughput adaptation (ITA) techniques of the present invention may be applied.

The following detailed explanations of FIGS. 1–9 and of the preferred embodiments reveal the methods and apparatus of the present invention. The present invention takes advantage of evolutions in satellite and terrestrial communications technologies to support terrestrial communications with satellite communications in a unique way. The invented system includes an ensemble of components that provide both a complete solution for the QoS-based establishment and transmission of broadband communications over SATCOM. The system includes bandwidth efficient modulation that can dynamically adapt to changes in the RF propagation environment and baseband interface processing and switching to support seamless interface with terrestrial infrastructure based on any one or combination of protocols including, but not limited to: IP, ATM, Frame Relay, and Streaming Data protocols.

The communications system of the present invention has standardized interfaces to allow mixing and matching for alternative frequency bands and terrestrial interfaces. Although not required, the modulation scheme preferably provides a constant power and bandwidth envelop at the input to the satellite transponder and can support data rates consistent with the terrestrial infrastructure (e.g., DS3, OC-3, OC-12). Resource management and control is performed autonomously between transmitting and receiving devices, with no external management infrastructure required.

In accordance with an exemplary embodiment, the system of the present invention includes a satellite link that uses bandwidth efficient modulation capable of adaptively adjusting the data rate via the modulation and coding schemes in response to rain fade conditions to maximize information throughput while ensuring signal quality. The system of the present invention is particularly useful at frequencies susceptible to attenuation of electromagnetic energy by water or atmospheric gases, such as Ka-band and Ku-band frequencies. While the advantages of the invention in a Ka-band or Ku-band system will become evident, the invention is not limited to such systems and applies to any transponder satellite solution. Advantageously, the system responds to changing rain fade condition without changing the air interface RF signature. Specifically, the power, bandwidth and frequency remain constant, while the bandwidth efficient modulation scheme is adjusted to change the information throughput rate and account for signal-to-noise reductions caused by rain fading. The baseband interface processing and switching is consistent with the terrestrial infrastructure's resource management in a way that takes advantage of the QoS strategy for managing traffic. The information throughput adaptation of the present invention can be performed autonomously on a link-by-link basis without the need of an overlaid control system.

In particular, the concept of Information Throughput Adaptation (ITA) is employed by the present invention to mitigate the rain fading that occurs over satellite links by decreasing the information rate rather than increasing power. ITA is readily implemented in the context of a network-centric architecture based on packet switching and supports end-to-end QoS that can provide a desired information rate at an availability tailored to the criticality of the information.

While reference is frequently made herein to "rain fading" and "rain fades" it will be understood that the techniques of the present invention address any atmospheric or extraterrestrial conditions which cause RF signal attenuation or interference resulting in a reduction of the receive signal strength relative to the received noise, including any weather conditions as well as sunspots and the like.

FIG. 1 illustrates an example of a SATCOM scenario on which ITA may be applied. The depicted scenario includes a number of remote terminals connected via a satellite link to a Gateway Earth Station Hub which provides the remote terminals with access to a wide area network (WAN). The forward link from the earth station hub to the remote terminals includes a single very high-speed broadcast link that all remote terminals receive. The broadband forward link is transmitted from the earth station hub to a satellite, which relays the forward link signal to the remote terminals. The return link from the remote terminals to the earth station hub is illustrated as multiple lower-speed links, with each remote terminal having a dedicated link. The individual return links are transmitted from the respective remote terminals to the satellite, which relays the return links to the earth station hub. While the information throughput rate on the forward link may vary over time, since the remote terminals in the example shown in FIG. 1 are on the same forward link, at any given time, the remote terminals all receive signals at the same information throughput rate. However, since remote terminals communicate with the earth station hub via separate return links, the return links may have differing information throughput rates at any point in time.

Figure 2:
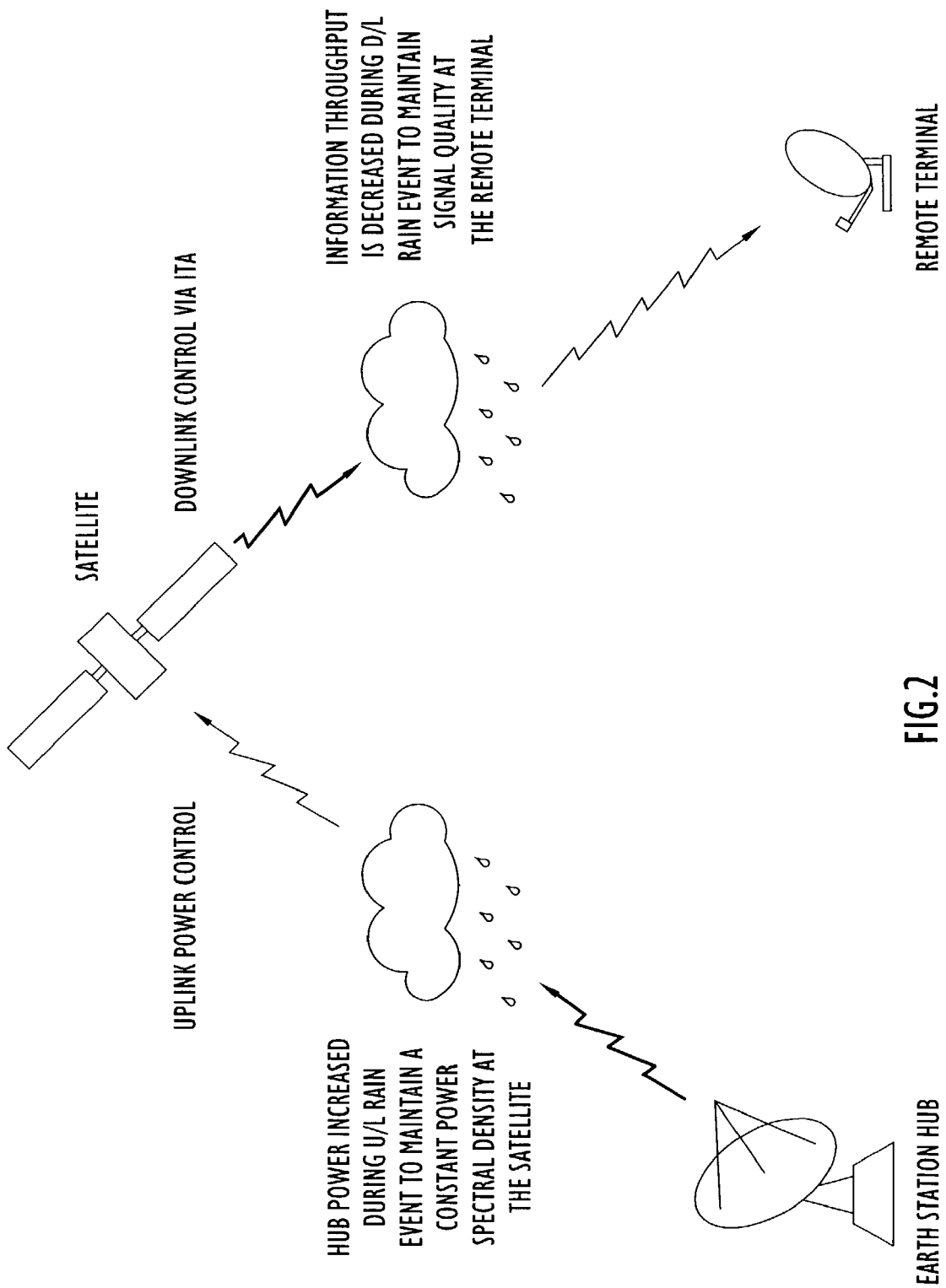
FIG. 2 is a conceptual illustration of uplink power and downlink ITA control techniques employable on a forward link from an earth station hub to a remote terminal in accordance with an exemplary embodiment of the present invention.

As shown in FIG. 2, in the context of this SATCOM scenario, ITA is applied to mitigate downlink rain fades on the forward link (i.e., the link between the satellite and the remote terminals) to maintain desired signal quality. The earth station hub has a limited ability to increase transmit power on the forward link due to limitations on the operating point of the satellite transponder and spectrum containment regulations that forbid the power density on the ground from exceeding a defined amount; increasing the power in a satellite beam to overcome rain fading can result in "over limit" power in areas of the coverage beam where it is not raining.

In addition, control of earth terminal transmit power for compensation of downlink rain fades is a complex task that cannot be implemented for a single link, but must be addressed within the context of overall management of the transponder power and bandwidth. In contrast, since the forward link uplink travels from a single point to another single point (i.e., from the earth station hub to the satellite), the forward link uplink is uniformly affected by rain fade conditions at any given time. Consequently, varying rain fades conditions on the forward link uplink can optionally be addressed by varying the power of the earth station hub signal to maintain a substantially constant power at the satellite (e.g., the earth station hub power is increased during uplink rain events to maintain a constant power spectral density at the satellite). Of course, ITA may also be used to address uplink rain fade conditions; however, use of power control to overcome uplink rain fading avoids or reduces the need to reduce information throughput without saturating the satellite transponder and violating spectral containment requirements. Although the return link is not shown in FIG. 2, it should be understood that information throughput adaptation is also applicable to mitigate downlink rain fades on the return links from the remote terminals to the earth station hub.

ITA is more than just an equivalent alternative/substitute to static power margin/power control methods for operation in the Ka band, since ITA has an added advantage not possible with power margin/power control methods. In the static power margin/power control methods, satellite bandwidth (data rate) is fixed and additional reserve power (margin) is provided to compensate the rain attenuation. However, such a reserve capacity (margin) is not used during normal conditions (i.e., no rain). ITA, on the other hand, allows the reserve capacity (power margin) to be used to carry additional user traffic (higher data rate) during normal conditions when the reserve power margin is not needed for rain compensation, while allowing for a graceful performance degradation (reduced data rate) during heavy rain conditions as the reserve power margin must be used temporarily to compensate for the rain attenuation. This is accomplished by changing the modem's modulation and coding scheme and reducing the data throughput (pipe size) "on-the-fly" in response to the heavy rain situation. By changing modulation and coding schemes along with reducing the data rate, less power is required to maintain desired link performance, effectively compensating for the rain attenuation with a reduced data rate. In other words, ITA enables a tradeoff of user data throughput to effectively reduce the required signal-to-noise ratio for the specified quality of service. Note that the degraded performance here would be equivalent to the "normal performance" under the static power margin method, since the reserve capacity is not used during normal condition.

Figure 3:
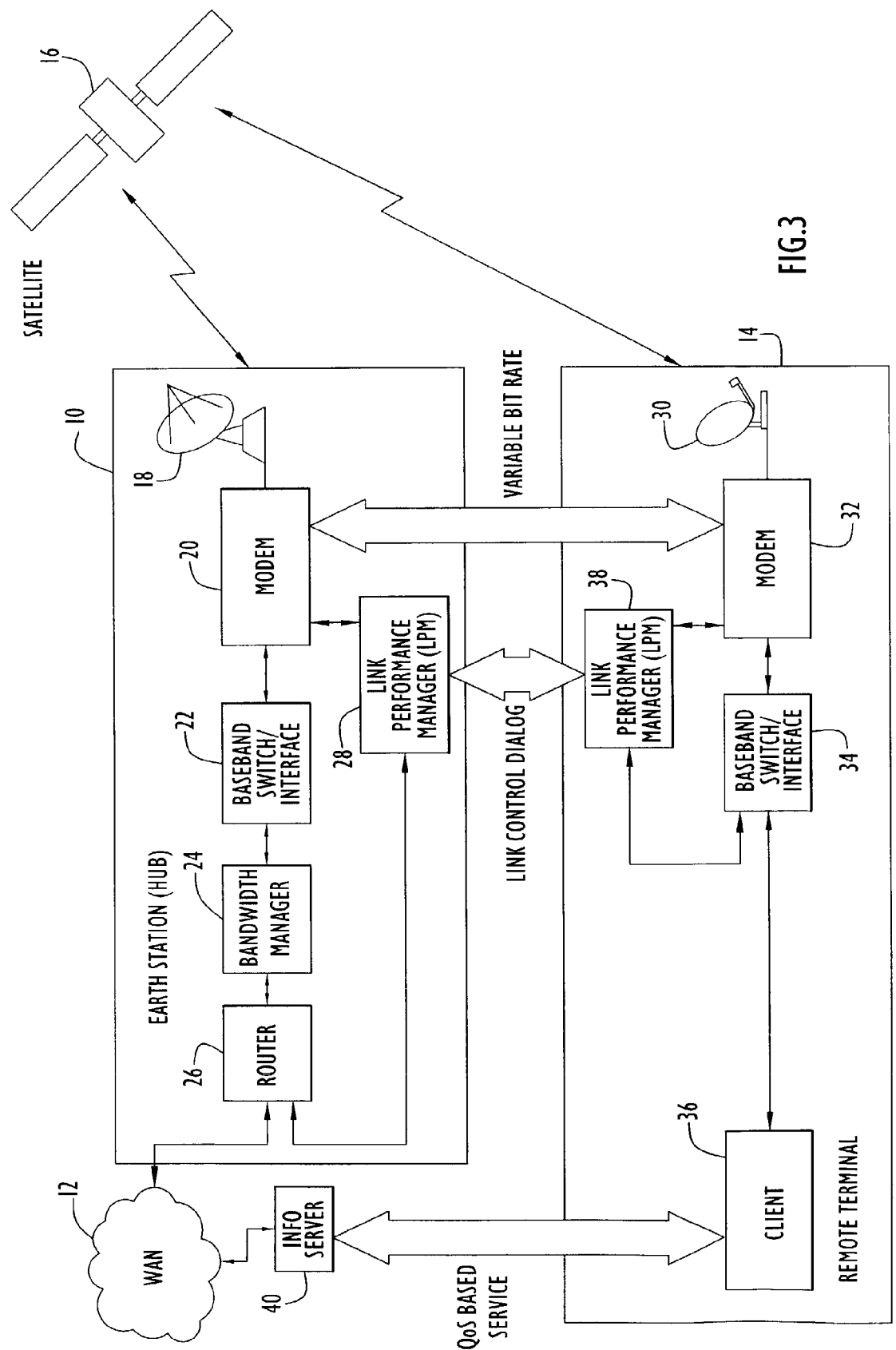
FIG. 3 is a block diagram illustrating an overall ITA system architecture in accordance with an exemplary embodiment of the present invention and applied to the forward link transmitted from the earth station hub to the remote terminal.

A block diagram illustrating the overall ITA system architecture in accordance with an exemplary embodiment of the present invention is shown in FIG. 3. The architecture includes an earth station hub 10 serving as a gateway to a wide area network (WAN) 12 and communicating with a remote terminal 14 via a SATCOM link supported by a satellite 16. As used herein and in the claims the term "earth station hub" refers to a communications unit capable of linking one or more remote terminals to a communications network (e.g., a WAN, LAN, wireless or wired, etc.) via a satellite communications link, thereby providing the remote terminal with access to sources of information, such as data, audio, and/or video signals. The remote terminal can be virtually any communication device, mobile or stationary, equipped with or supported by the appropriate RF/IF hardware for satellite communications, modem and interface, including but not limited to: any type of computer; a handheld or body-mounted radio; any type of mobile or wireless telephone (e.g., analog cellular, digital cellular, PCS or satellite-based); a pager, beeper or PDA device; a radio carried on, built into or embedded in a ground-based or airborne vehicle; any portable electronic device equipped with wireless reception/transmission capabilities, including multimedia terminals capable of receiving/transmitting audio, video and/or data information; and any device mounted in a fixed location with transmission/reception capabilities.

Earth station hub 10 includes radio frequency equipment (RFE) 18, a modulator/demodulator (modem) 20, baseband switch and interface 22, a bandwidth manager 24, a router 26 and a link performance manager (LPM) 28. While depicted in FIG. 3 as separate functional elements to facilitate description, it will be understood that the present invention is not limited to any particular hardware or software configuration, and various elements and operations can be physically or functionally integrated depending on the particular requirements of the system.

RFE 18 includes the portion of the system associated with the intermediate frequency (IF), radio frequency (RF), and antenna equipment. Modem 20 is coupled to RFE 18 and functions to modulate/demodulate the signals transmitted to and from the satellite in accordance with the adaptive, bandwidth-efficient modulation and coding scheme associated with the ITA technique of the present invention. Preferably, modem 20 is a rapidly configurable satellite modem that can change modulation and coding on command. Link performance manager 28 is coupled to modem 20 and router 26 and monitors and controls modem 20. Link performance manager 28 includes traditional management and control (M&C) for health and status of equipment, as well as configuration management of the earth terminal equipment for dynamic service provisioning.

Baseband switch and interface 22 is coupled to bandwidth manager 24 and modem 20 and interfaces with external data sources (e.g., Telco, Internet Service Provider, DTH broadcaster, or a packet-switched wide area network as depicted in the exemplary embodiment). Interface 22 converts packet-switched data received from WAN 12 into the mission traffic to be sent to modem 20 and converts WAN-bound traffic received by modem 20 into data. Modem 20 works with interface 22 to provision the bandwidth-on-demand services based on the Quality of Service negotiated with the end user. The interaction between the modem and baseband interface is essentially where the satellite communications and terrestrial communications come together, and the interaction between the QoS-based terrestrial and the dynamically changing satellite communications occurs.

Router 26 receives data from WAN 12 and delivers incoming data to WAN 12. Bandwidth manager 24 is between router 26 and baseband switch and interface 22 and sets and enforces different QoS parameters (bandwidth and priority) on different traffic types designated by application, user IP address, and other methods.

Remote terminal 14 includes radio frequency equipment (RFE) 30, a modulator/demodulator (modem) 32, and baseband switch and interface 34 permitting a client machine 36, such as a personal computer, to communicate with the gateway earth station hub 10 over the SATCOM link via satellite 16. RFE 30 includes the portion of the system associated with the IF, RF, and antenna equipment. Modem 32 is coupled to RFE 30 and functions to modulate/demodulate the signals transmitted to and from the satellite in accordance with the adaptive, bandwidth-efficient modulation and coding scheme associated with the ITA technique of the present invention. Preferably, modem 32 is a rapidly configurable satellite modem that can change modulation and coding on command. A link performance manager 38 is coupled to baseband switch and interface 34 and modem 32 and monitors and controls interface 34 and modem 32.

The exemplary architecture supports three important interactions shown via the wide vertical bi-directional arrows in FIG. 3. It will be understood, of course, that these arrows are conceptual; the signals required to support these interactions are transmitted between the gateway earth station hub 10 and remote terminal 14 via the SATCOM link.

First, client-server dialog supported by a QoS manager is conducted over the link supported by the gateway earth station hub 10 and remote terminal 14. The system supports the end-to-end process, whereby the client machine 36 at remote terminal 14 needs to communicate (e.g., request for file transfer, etc.) with a server 40 on WAN 12 available via the earth station hub 10. Earth station hub 10 serves as the gateway for all PCs at remote locations. The client-server communication supported is in the form of TCP/IP or UDP/IP (user datagram protocol/internet protocol) session utilizing QoS-based prioritization schemes to enable the management of traffic under degraded conditions. Second, dialog occurs between the link performance managers 28 and 38 respectively located at the earth station hub 10 and remote terminal 14 to monitor and control the link quality and information throughput. To provide an automated, coordinated control of the adaptation process, a link performance manager (LPM) is required at both the remote terminal and earth station hub. To provide this coordinated control, the hub LPM 28 and remote LPM 38 communicate with each other via the SATCOM forward and return links along with client-server traffic. The LPM control messages require a high QoS in order to maintain control while the link is in a degraded state. Third, a variable user data rate link exists between the hub modem 20 and the remote terminal modem 32.

Figure 4:
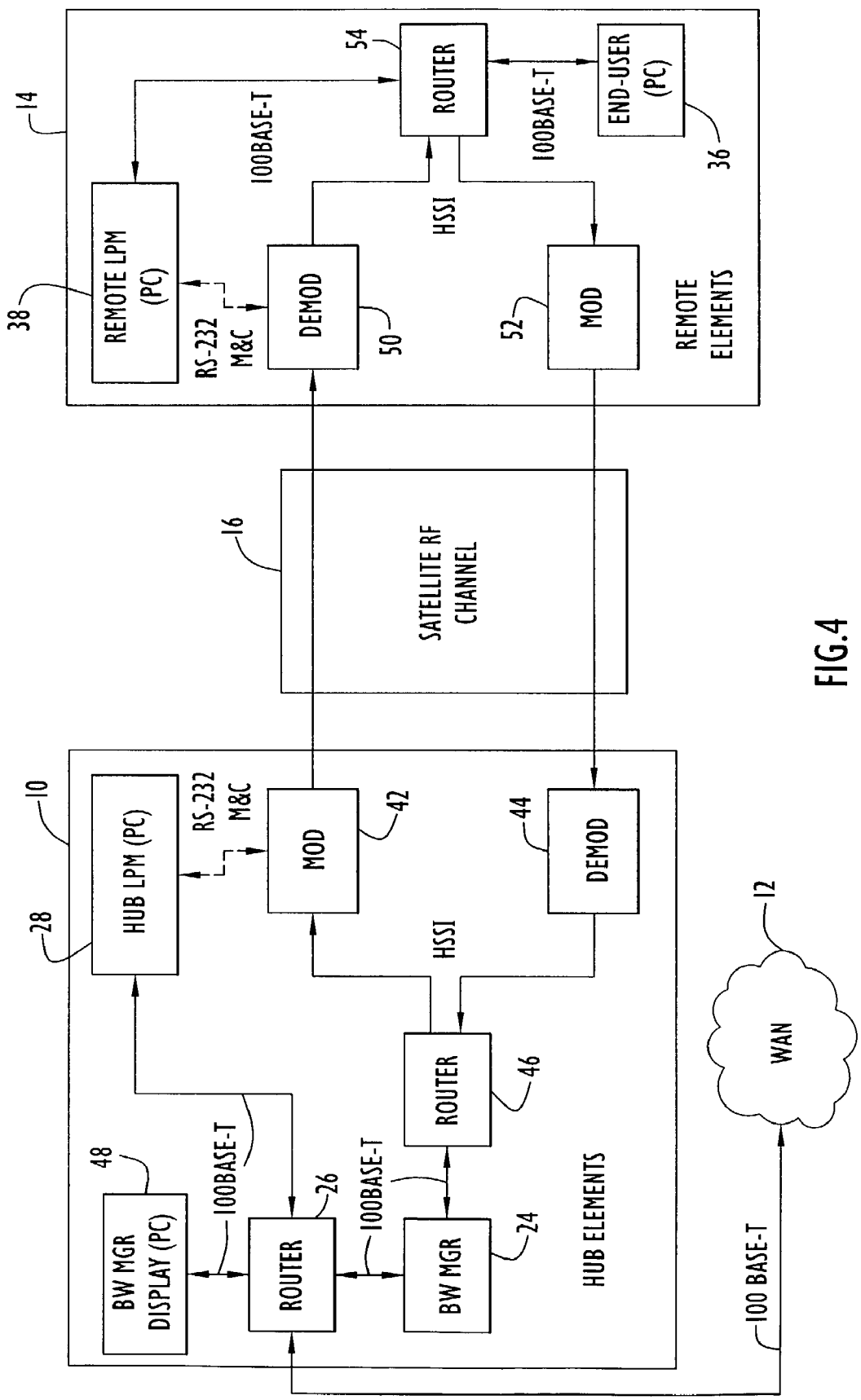
FIG. 4 is a block diagram illustrating an ITA system architecture and focusing on elements of the earth station hub and remote terminal used to perform ITA on the forward link in accordance with an exemplary embodiment of the present invention.

For purposes of describing operation of ITA technique of the present invention in the context of the forward link, a slightly more detailed block diagram emphasizing certain components of the system architecture of the exemplary embodiment is shown in FIG. 4. Hub modem 20 is shown as a modulator 42 and demodulator 44 coupled to a modem interface router 46 serving as baseband interface 22 (FIG. 3). Earth station hub 10 further includes a PC-based bandwidth manager display 48 coupled to WAN-interface router 26. Bandwidth manager 24 handles signals from WAN-interface router 26 bound for modem interface router 46 and signals from modem interface router 46 bound for WAN-interface router 26. Hub link performance manager 28 is PC-based and communicates with WAN-interface router 26 as well as modulator 42.

Likewise, the remote terminal modem 32 is depicted as a demodulator 50 and modulator 52 which are coupled to the end user (PC) 36 via a modem interface router 54. Remote link performance manager 38 is PC-based and communicates with modem interface router 54 as well as demodulator 50.

For ease and clarity of description, in the scenario depicted in FIG. 4, ITA is implemented only in the forward link direction (i.e., the hub-to-remote link). The return link (remote-to-hub link) maintains a fixed power with no adaptation. In an operational system, ITA would preferably be deployed to compensate for the rain attenuation on the return link as well. Because ITA is implemented only on the forward link in this example, the bandwidth manager 24 is utilized to manage only the QoS-based prioritization of forward traffic.

The modems preferably feature a high-speed, variable bit rate, selectable modulation/coding schemes, and "on-the-fly" data rate programmability by the LPM. Referring to FIG. 4, these features are supported by a High Speed Serial Interface (HSSI) between the hub modulator 42 and interface router 46 and between hub demodulator 44 and interface router 46 (e.g., a HSSI Y-cable). Likewise remote demodulator 50 and modulator 52 are coupled to remote modem interface router 54 via a HSSI Y-cable.

The HSSI is a synchronous high-speed interface and hence is supported in a variety of commercially-available router products. The HSSI provides a very suitable accommodation of the ITA concept, since, not only does the HSSI support the variable bit rate feature of the modem, but also allows the modem to be the "master", as by its design the modem determines the data rate and controls the HSSI synchronizing clock (separate from the data) from which the router derives the data rate "on-the-fly". This configuration implies simpler control algorithms, since only the modem needs to be controlled by the link performance manager for data rate changes, while the router automatically follows the rate changes via the HSSI clock. Although the HSSI is a full-duplex interface, the outbound and inbound data rates need not be identical. In fact the outbound and inbound data rates can be very asymmetrical (e.g., a very high-speed data on the forward link, and a very low-speed data on the return link) and operate independently, as long as the inbound and outbound clocks are separate (i.e., not coupled).

On both the hub modulator 42 and remote demodulator 50, a status and control port is accessed via an RS-232 serial connector that allows the Link Performance Manager (LPM) direct access to the modem performance measurements and configuration control. Through this port, the LPM commands its respective modulator or demodulator into a new modulation/code configuration. Remote LPM 38 also uses this port to externally monitor output parameters supplied by remote demodulator 50, such as energy per bit to noise density power ratio (Eb/No), and bit error rate (BER).

In earth station hub 10, 100 Mbps, baseband, twisted pair (100 BaseT) Ethernet interconnects modem interface router 46 with bandwidth manager 24, and WAN interface router 26 with bandwidth manager 24, WAN 12, bandwidth manager display 48 and hub LPM 28. Likewise, remote modem interface router 54 is connected to remote LPM 38 and the end-user PC 36 via 100 BaseT Ethernet.

While the interface between the hub modem and the wide area network is shown in FIGS. 3 and 4 as comprising particular elements (i.e., modem router 46, bandwidth manager 24, and network router 26), it will be understood that the information throughput adaptation technique of the present invention is applicable in virtually any context in which data is been modulated and demodulated for transmission and reception over a SATCOM link, and is not limited to any particular interface scheme between the modem and the ultimate data source or destination devices.

The information throughput adaptation system shown in FIGS. 3 and 4 operates to mitigate the effects of varying rain fade conditions while maintaining acceptable signal quality and maximizing information throughput. There are essentially two ways to mitigate rain fade. One is to dynamically increase power on the link as rain occurs. The other approach is to initially build into the link enough power margin, such that sufficient power reaches the receiver despite the signal attenuation due to rain. The adaptive approach allows the excess power in the system to be set aside in a reserve pool and then distributed in individual links as necessary to handle specific rain fades. An underlying assumption of this approach is that not all links are simultaneously suffering rain fading at the same time, a safe assumption if the satellite footprint covers a geographically extensive area so that rain fades can be considered statistically independent.

However, beyond the problem of requiring extensive control, the adaptive approach has a number of drawbacks. Consider that, if rain fading occurs on the uplink, and power is adaptively increased, the same amount of power reaches the satellite as would have reached the satellite under low-power, clear-air conditions. In contrast, if the rain fading occurs on the downlink, when power is increased on the uplink to compensate, the signal reaching the satellite has an increased power level. In a statistically independent scenario, this signal power increase may not be problematic. However, if many users are transmitting to the same destination over a path experiencing a downlink rain fade, the satellite receives numerous uplink signals having increased power levels. At some point, the combined increased power will cause the satellite amplifier to saturate, thereby locking up the satellite. Consequently, performing uplink power control to mitigate a downlink fade requires that the system monitor the satellite transponder operating point and avoid amplifier saturation. Moreover, if the satellite footprint is relatively small, the independence of rain fades cannot be assumed, and the foregoing problem is more likely to occur.

The present invention employs the second approach to avoiding rain fading: having in every link a static power margin sufficient to reliably receive signals during rain fades. At Ka-band, this approach is sensible in both military and commercial systems. The satellite antenna beamwidth at Ka-band is such that the satellite footprint covers a relatively localized geographical area beam rather than producing a global coverage beam. In the military context, the satellite may not be power limited but rather bandwidth limited, and the smaller footprint may be suitable for supporting communications relating to regional conflicts. In the commercial realm, the trend may also go toward spot coverage so that power is not wasted in remote, low-use areas and capacity is focused on high-demand areas. With the spot-like regional coverage provided by a Ka-band system, the statistical independence of rain cannot be assumed, and the approach of having static excess power in every link becomes more attractive than adaptive power control due to the aforementioned saturation problem.

In a conventional system in which a static power margin exists in each link, each link essentially wastes the excess power when it is not raining. In contrast, the present invention uses the excess power to increase throughput during clear conditions by employing bandwidth efficient modulation and variable rate error-correction coding.

According to the present invention, links are allocated a static power margin pool to provide required availability based on propagation model and minimum desired data rate. Modulation and/or coding are dynamically adjusted to increase or decrease throughput based on exigent conditions. Dynamic adjustments can be made autonomously on a per-link basis or controlled through centralized network management. Throughput adjustment is provided to the baseband interface to effect QoS transactions.

An example of the power margin strategy employed by the present invention follows. Referring again to FIG. 4, remote LPM 38 uses energy per bit to noise density power ratio (Eb/No) reports received from remote demodulator 50 to determine the received carrier power to noise power density ratio (C/No) and the need to switch to an alternative modulation/coding state based on a comparison with the required C/No of the current state. The information rate and the required Eb/No determine the required C/No. For illustration purposes, the characteristics of three modem "states" are listed in Table 1 below. Note that for all three states, the symbol rate is the same so that the RF spectrum is the same. Note also the difference in the "Required C/No" and the "Information Rate." While, in the exemplary embodiment, the parameter Eb/No is measured by the receiving demodulator and the corresponding C/No value is evaluate by the LPM, it will be understood that virtually any signal reception parameter indicative of the quality or condition of the link or signal attenuation conditions affecting the received signal can be measured or evaluated to determine whether a change in the information throughput rate is warranted.

TABLE 1

Modem States and Corresponding Information Throughputs and Eb/No

| State | Mod/Code* | Baud (sym/sec) | Req. C/No (dB-Hz) | Req. Eb/No** (dB) | Info Rate (Mbps) |
|---|---|---|---|---|---|
| 1 | 16QAM R7/8 | 1,636,364 | 77.10 | 9.9 | 5.25 |
|  | Margin change |  | 6.23 |  |  |
| 2 | 8PSK R2/3 | 1,636,364 | 70.87 | 6.1 | 3.00 |
|  | Margin change |  | 5.51 |  |  |
| 3 | QPSK R1/2 | 1,636,364 | 65.36 | 3.6 | 1.50 |

*Includes Outer Reed-Solomon (RS) code
**Typical modem performance at $10^{-8}$ bit error rate (BER)

Table 1 illustrates a conceptual example of how information throughput is controlled by the choice of modulation and coding. Most modem modems are configurable by command to assume different modulations, modulation rates and error correction coding rates. The table shows three different configurations of a modem that provide 1.5, 3.0 and 5.25 megabits per second (Mbps) of information throughput. With the symbol rate (Baud) held constant, a change in modulation and code rate enhances the link margin in two ways: the required energy per bit to noise density power ratio (Eb/No) of the link is reduced; and the data rate carried by the link is reduced.

The required carrier power to noise power density ratio (C/No) in Table 1 captures both of these factors. Note that a change from the 16QAM (Quadrature Amplitude Modulation) to the 8PSK (Phase Shift Keying) configuration increases the link margin by 6.23 dB, and a change from 8PSK to QPSK (Quaternary Phase Shift Keying) increases the link margin by an additional 5.51 dB. Thus, in this example, a total of 11.74 dB of link adaptation is achievable by varying the information throughput while keeping the symbol rate constant.

Note that the available signal modulation schemes in this example include QPSK, 8-PSK and 16-QAM. Since quadrature amplitude modulation does not produce a constant envelope signal, this example illustrates that the invention is not strictly limited to a constant power configuration. However, the invention can be advantageously implemented with signal modulation schemes that result in a constant-power RF signal, such as N-ary PSK.

In the example shown in Table 1, the error correction codes are Reed-Solomon codes and convolutional encoding with rates for the three throughput states of 7/8, 2/3 and 1/2, respectively. However, it will be understood that the present invention is not limited to any particular error correction coding scheme or particular coding rates.

Referring again to Table 1, the baud rate of 1.6 Mbaud (Msymbols/sec) is the same for each of the three operating states, such that the system bandwidth is constant regardless of the operating state. These C/No values can be mapped onto a Ka-band fade statistics graph for a particular locality. It is assumed that the link is engineered to support the highest C/No value with adequate margin for "Normal Operation" of 99% link availability. With QPSK, 8-PSK and 16-QAM, for the exact same baud rate on the air interface side, the data rate can increase significantly, but note also that as the modulation scheme becomes more sophisticated, the signal-to-noise ratio must be greater to avoid errors.

From Table 1, it can be seen that from the lowest modulation/coding scheme to the highest, there is change in dynamic range of almost 12 dB (i.e., 11.74), but the data rate increases nearly fourfold (from 1.5 to 5.25 Mbps). In other words, the system can adapt to a 12 dB rain fade on the downlink simply by changing the signal modulation scheme and error correction coding rate. Consider, for example, a link at 20 GHz in the Washington, D.C. area which, based on ACTS satellite data, requires a static power margin of 15 dB to achieve a specified minimum data rate 99.94% of the time. If the selected data rate is to be achieved only 99.8% of time, only about 8.5 dB of static margin is required on the hypothetical link. Similarly, performance can be met 99% of the time with about 3 dB static margin on the hypothetical link. If there is 12 dB of dynamic range in the information throughput scheme, 3 dB additional static power margin equals 15 dB. Consequently, if the system is designed with 15 dB of static power, 99% of the time a data rate of 5.25 Mbps can be achieved. When a rain fade reduces the signal-to-noise ratio below a certain level (e.g., as a function of bit error rate) the modulation and coding are changed (i.e., to state 2) to reduce the data rate from 5.25 Mbps to 3 Mbps. In the most severe rain fade, the modulation is reduced to QPSK with 1/2 coding (state 3), resulting in a data rate of 1.5 Mbps. At this level, there is still 3 dB of static power margin, because only 12 dB of margin is required to implement the information throughput adaptation. Thus, this example illustrates the increase in data rate that is achievable by adaptively changing the modulation and coding scheme: 1.5 Mbps is available 99.94% of the time; an additional 1.5 Mbps is available 99.8% of the time; and an additional 2.25 Mbps is available 99% of the time.

Summarizing, the static power margin in a link is determined based upon a minimum desired data rate and a desired availability of that minimum rate in view of rain fade statistics. Then when it is not raining, the modulation and coding are set to a higher order to expand the information throughput, which uses that static margin. The bandwidth and power are maintained at constant levels. By maintaining constant power, the system avoids employing a centralized controller to authorize power increases (which would otherwise be necessary to guard against satellite amplifier saturation). Preferably, bit count integrity is maintained when the modulation and coding scheme is changed to avoid loss of data; however, in most contexts, bit count integrity is not essential or required.

Figure 5A:
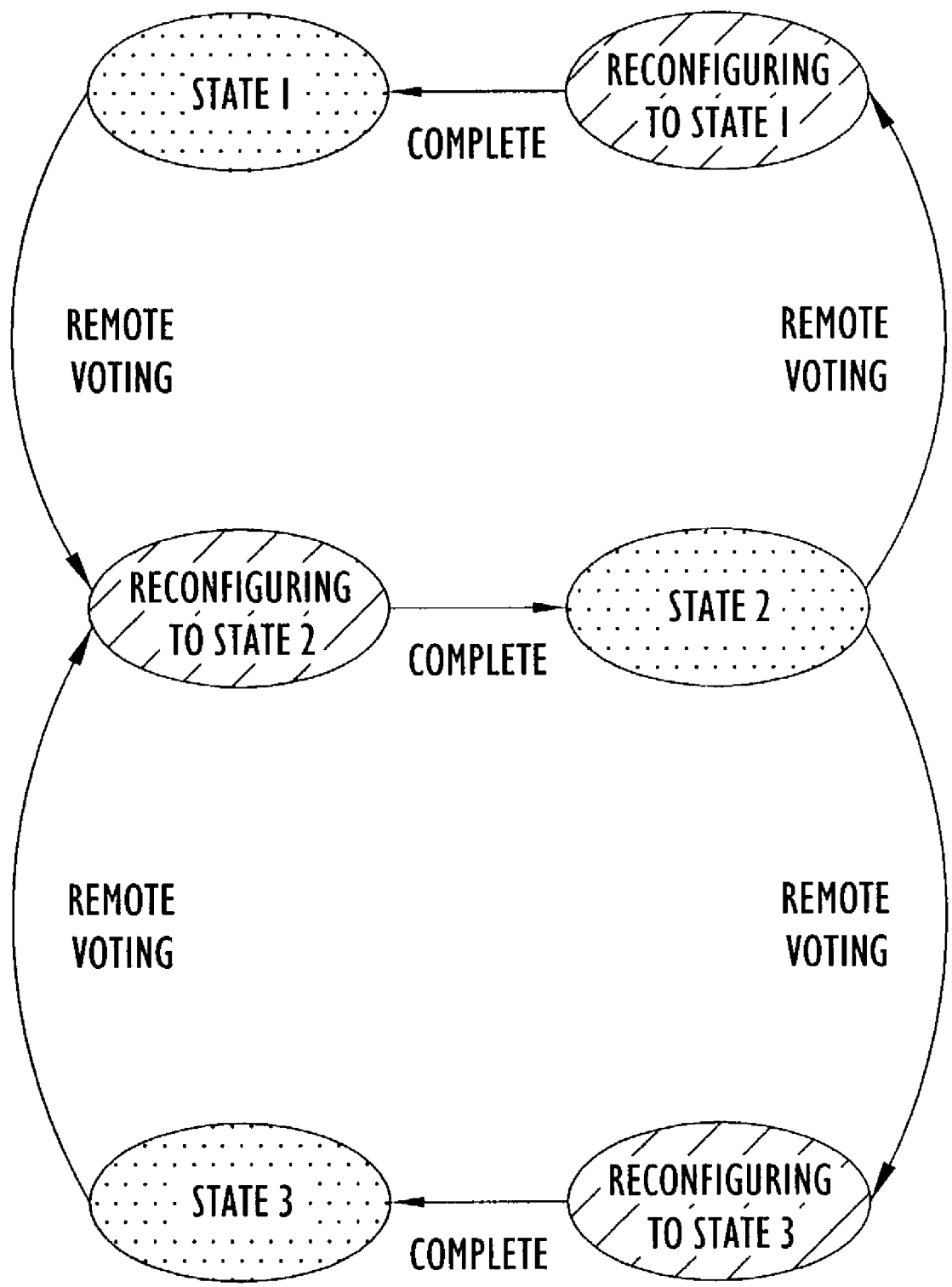
FIG. 5a is a system state diagram relating to forward link hub states and transitions in accordance with an exemplary embodiment of the present invention.
Figure 5B:
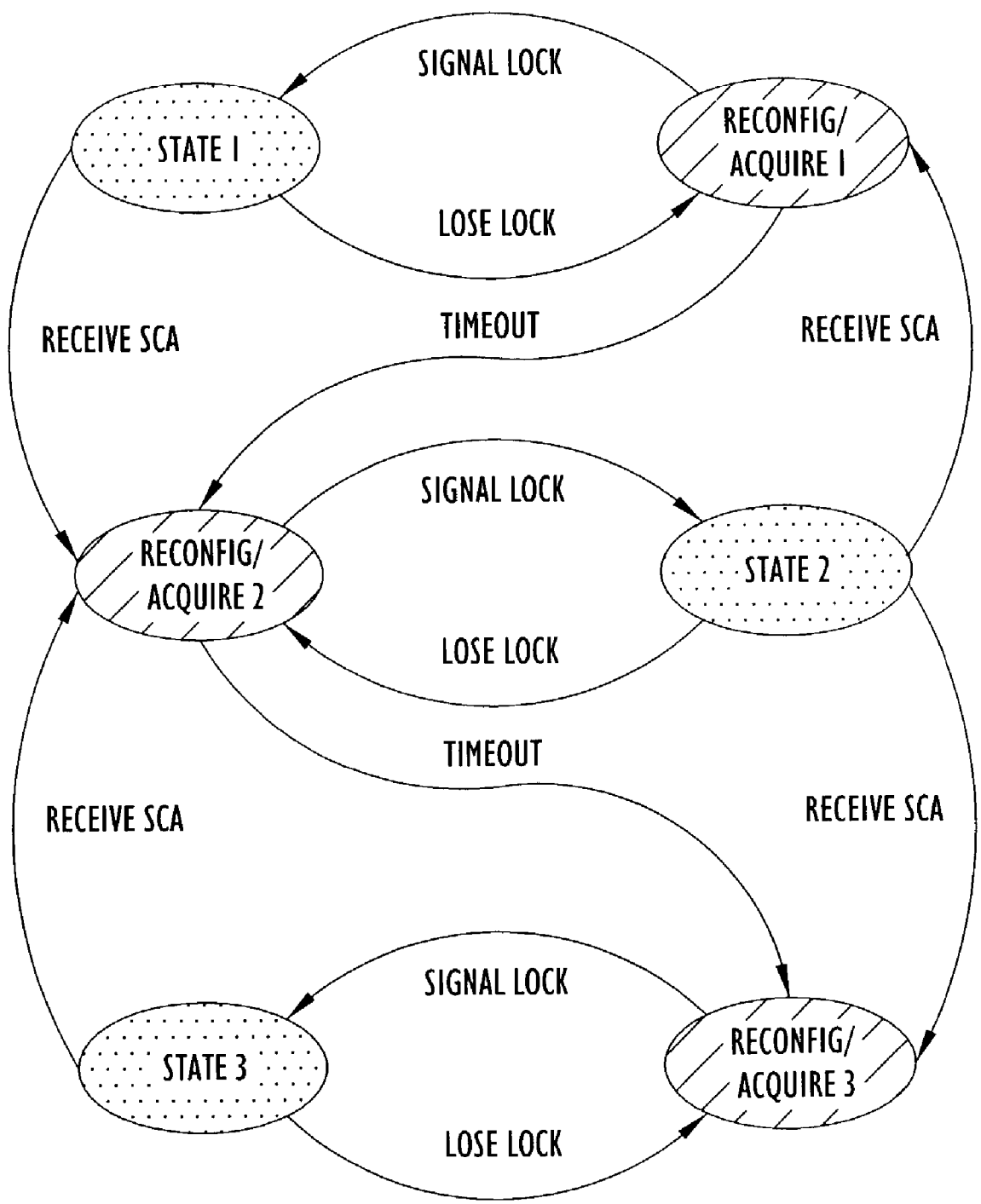
FIG. 5b is a system state diagram relating to forward link remote terminal states and transitions in accordance with an exemplary embodiment of the present invention.

FIGS. 5a and 5b are system state diagrams illustrating three forward link states and transitions for adapting to varying rain attenuation at the earth station hub and remote terminal, respectively. The three numbered states shown in FIGS. 5a and 5b correspond to those shown in Table 1. However, it will be understood that the approach illustrated in these state diagrams applies to systems having any practical number of modulation/coding states. The earth station hub and the remote terminal have separated but coordinated state diagrams. In particular, each has three operationally ready states (state 1, state 2, and state 3) that correspond to the three modulation/coding states in Table 1. In addition, the earth station hub has three reconfiguring states that relate to the transition periods required to reconfigure the modulator to a new state. Similarly, the remote terminal has three reconfiguring/acquiring states that relate to the transition periods required to reconfigure the demodulator to a new state plus the period required to acquire the signal.

The states assumed by the earth station hub and remote terminal are coordinated via control messages exchanged by the hub and remote LPMs. Referring again to FIG. 4, remote LPM 38 monitors the performance of remote demodulator 50 and sends a state change request to the hub LPM 28 when a change in demodulator performance is detected. For an earth station hub that is serving plural remote terminals on the same forward link, this process involves a voting scheme where messages from a number of remote terminal LPMs are received and the hub LPM decides which state to enter based on all votes. When an earth station hub determines that a state change is needed (based on received votes), the earth station hub broadcasts a State Change Announcement (SCA), which identifies the next state and a time epoch for the state change. Remote terminal LPMs receive the SCA, and respond accordingly.

Referring again to FIG. 5a, the state behavior of the earth station hub is straightforward: the earth station hub changes from its current state only when the earth station hub receives a request from a remote terminal to do so. When the earth station hub is communicating with a single remote terminal on a particular link, a request for a state change from that remote terminal will cause the earth station hub to initiate a state change on the link. When the earth station hub is in communication with a plurality of remote terminals on the same forward link (e.g., broadcasting), the earth station hub considers the requests or "votes" of the plurality terminals in determining which state the link will operate. To provide acceptable signal quality to all remote terminals on the link, the earth station hub must select the lowest information throughout state requested by any of the remote terminals. However, virtually any decision/voting scheme which meets the link performance criteria of a particular system can be used, including those which factor the relative priorities of the requesting remote terminals into selection of the information throughput state.

If the earth station hub in state 1 receives a request (or a decisive vote) to change states, the earth station hub will broadcast an SCA identifying the state change and a time epoch of the state change. At the epoch time, the earth station hub will enter "Reconfiguring to State 2", and upon completing reconfiguration, the earth station hub will be in State 2. Likewise, when an earth station hub in state 3 receives a request (or a decisive vote) to change to state 2, the earth station hub will broadcast an SCA and enter "Reconfiguring to State 2" at the epoch time. Upon completing reconfiguration, the earth station hub will be in State 2. From State 2, the earth station hub can transition to State 1 (e.g., when remote terminal(s) send change requests in response to diminishing rain fade conditions) via "Reconfiguring to State 1" or to State 3 (e.g., when remote terminal (s) send change requests in response to increasing rain fade conditions) via "Reconfiguring to State 3." Remote terminal LPMs send change requests over the return link of the satellite to the earth station hub.

Referring again to FIG. 5b, remote terminal LPMs change the remote terminal modulation/coding state in response to either of two events: receiving an SCA on the forward link, or after losing signal lock and timing out. For example, upon receiving an SCA from the earth station hub commanding a change from State 1 to State 2, a remote terminal will enter the "Reconfigure/Acquire 2" state at the defined time epoch and after reconfiguring and acquisition is complete, the remote terminal will be in State 2. Similarly, upon receiving an SCA commanding a change from State 2 to State 3, the remote terminal will enter the "Reconfigure/ Acquire 3" state at the defined time epoch and, after reconfiguring and acquisition is complete, the remote terminal will be in State 3. While in State 2, upon receiving an SCA commanding a change from State 2 to State 1, the remote terminal will enter the "Reconfigure/Acquire 1" state at the defined time epoch and, after reconfiguring and acquisition is complete, the remote terminal will be in State 1. Finally, upon receiving an SCA commanding a change from State 3 to State 2, the remote terminal will enter the "Reconfigure/ Acquire 2" state at the defined time epoch and, after reconfiguring and acquisition is complete, the remote terminal will be in State 2.

If the remote terminal loses the signal without receiving an SCA or if the remote terminal cannot acquire the signal after reconfiguring in response to an SCA, the remote terminal will persist in reacquiring the lost signal, but after a timeout, the remote terminal will send a state change request on the return link for the next highest state (i.e., from State 1 to State 2 or from State 2 to State 3) and will then enter the acquisition state for the requested state. Thus, if while in State 1, the remote terminal loses lock, the remote terminal will enter the Reconfigure/Acquire 1 State and attempt to establish signal lock. If successful, the remote terminal will transition back to State 1. If the remote terminal does not establish signal lock within a timeout period, the remote terminal will transition to the Reconfigure/Acquire 2 State (and send a state change request to the earth station hub) and attempt to establish signal lock. If successful, the remote terminal will transition to State 2. If the remote terminal does not establish signal lock within a timeout period, the remote terminal will transition to the Reconfigure/Acquire 3 State (and send a state change request to the earth station hub) and attempt to establish signal lock. If successful, the remote terminal will then transition to State 3.

Figure 6:
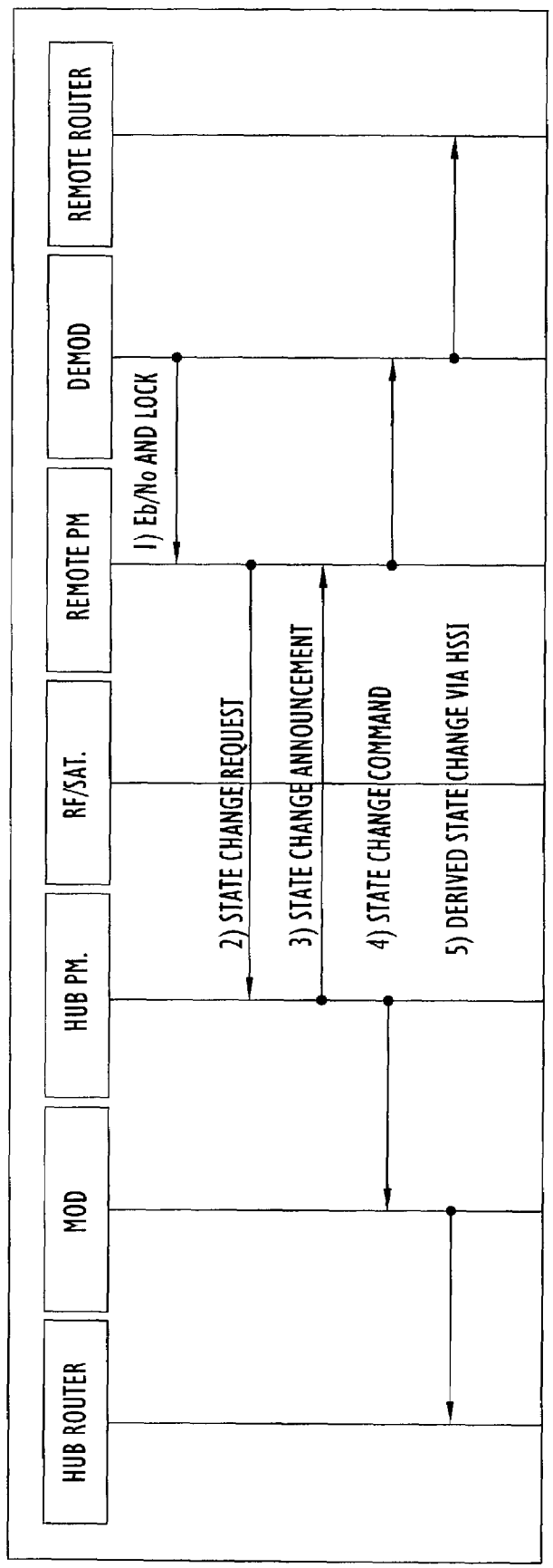
FIG. 6 is a chart illustrating system functional flow during the throughput adaptation process in accordance with an exemplary embodiment of the present invention.

FIG. 6 summarizes the functional flow indicating how the control function is propagated through the system and the chain of interactions between various elements in the system during the adaptation process. Only elements relevant to the control are included in the chain shown in FIG. 6. These elements include the earth station hub and remote modem interface routers, the earth station hub and remote LPMs, modulator, demodulator, and satellite uplink/downlink. Note that elements in the diagram are not necessarily arranged in the order that they are physically connected, but rather in the order that facilitates illustration of the control function flow across the system. In FIG. 6, it is assumed for simplicity of illustrating the function flow that the remote terminal generates the sole state change "vote" being sent to the earth station hub. With multiple remote terminal accessing the same link, the earth station hub would act to change the state only when warranted by the collective votes of the remote terminals.

Referring to FIGS. 4 and 6, during heavy rain attenuation, the control flows are as follows: attenuation causes the metric Eb/No value at the remote demodulator 50 to drop below a preset threshold level, which is monitored and detected by remote LPM 38. Upon a decision to change state, remote LPM 38 sends a state change request to hub LPM 28. When the request is received, hub LPM 38 sends a state change announcement (SCA) back to remote LPM 28, as well as a state change command to hub modulator 42 to change the modulation, coding and throughput. Upon receipt of the state change announcement (SCA) message from hub LPM 28, remote LPM 38 sends a state change command to remote demodulator 50 for the state change. Note that there is no need for explicit commands to be sent to the routers, since the modulator 42 and demodulator 50 control the HSSI clock, from which the router data rate is derived. As soon as state change commands are sent, the hub and remote LPMs attempt to communicate with each other to ensure that the adaptation is successful and the link is reestablished at the degraded state. The same chain of interactions is performed to recover from heavy rain; however, the commanded state change is in the opposite direction (i.e., to a higher throughput state). The triggering mechanism for the recovery process is the occurrence of the metric Eb/No value increasing, as a result of diminishing rain attenuation, above a preset threshold. Preferably, the recovery threshold is different from the threshold used to trigger the state change to a lower throughput level, as described in greater detail below.

Figure 7:
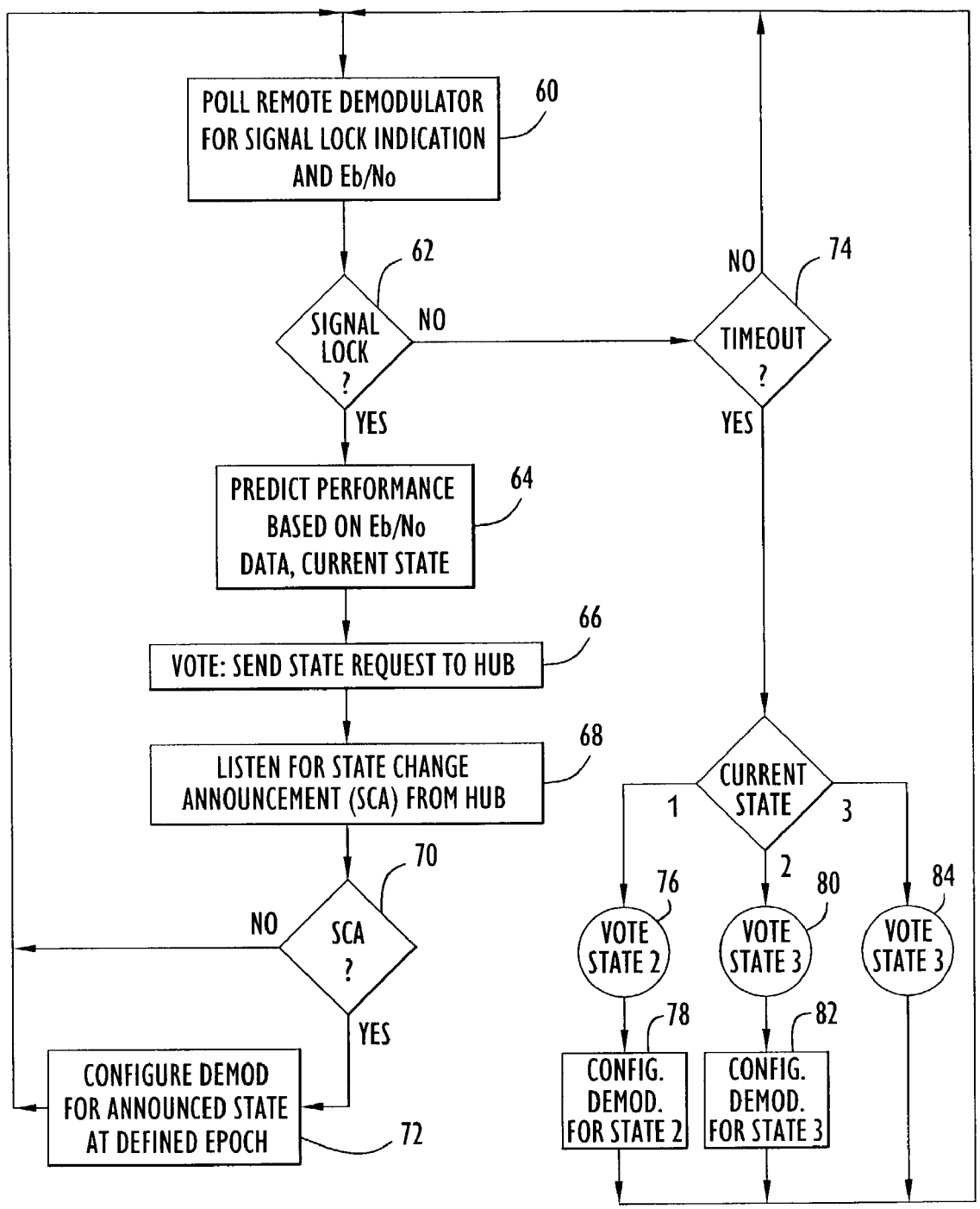
FIG. 7 is a functional flow diagram illustrating the remote terminal demodulator control process in accordance with an exemplary embodiment of the present invention.
Figure 8:
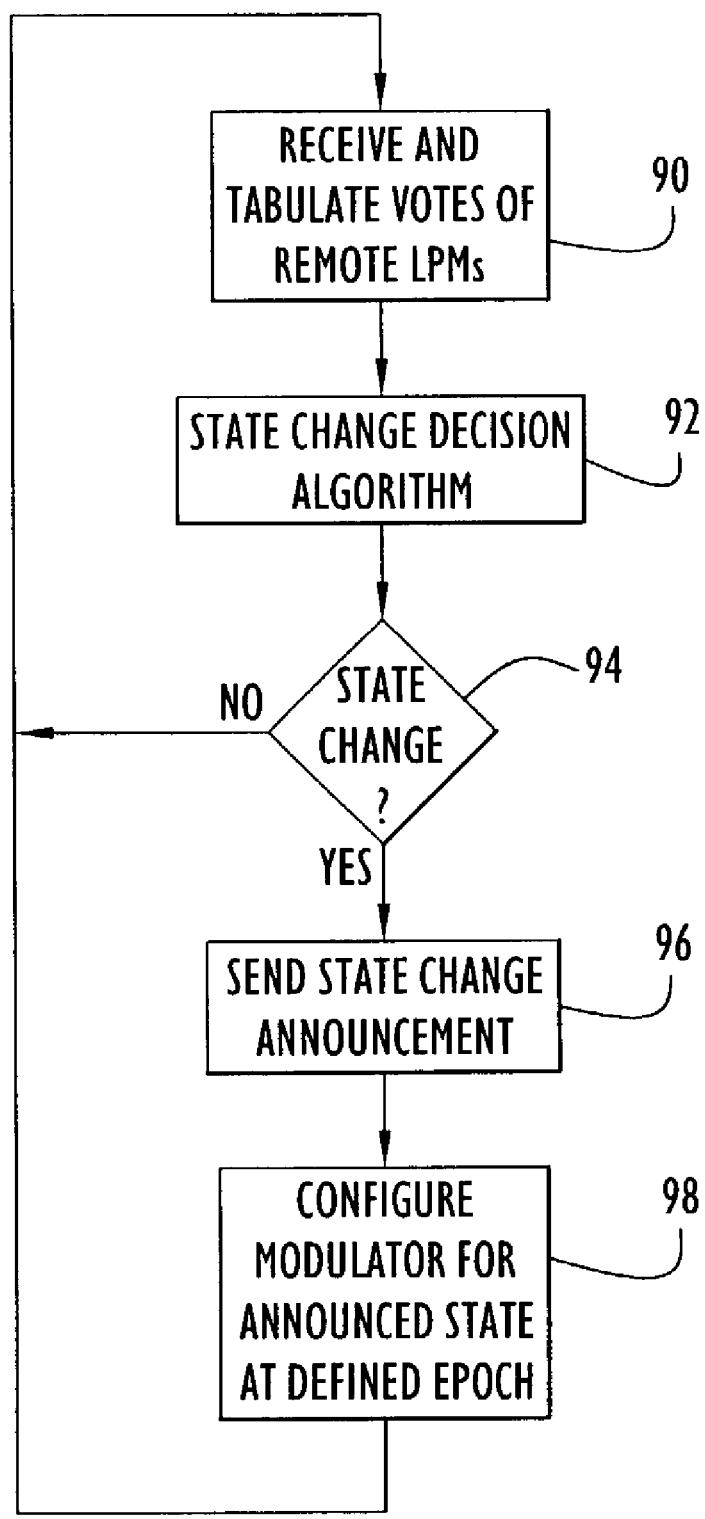
FIG. 8 is a is a functional flow diagram illustrating the earth station hub demodulator control process in accordance with an exemplary embodiment of the present invention.

FIGS. 7 and 8 are functional flow diagrams respectively relating to the remote terminal and earth station hub, which illustrate in detail the logic and control of the information throughput adaptation technique of the present invention. As shown in FIG. 7, the remote LPM periodically polls the remote demodulator for signal lock and Eb/No (operation 60). By way of non-limiting example, the remote LPM can poll the remote demodulator at approximately 0.5 second intervals. If the signal lock status reported by the remote demodulator indicates, in operation 62, that signal lock is present, the remote LPM then determines the most desirable throughput state for the remote terminal in accordance with a margin prediction algorithm based upon the recent history of Eb/No and the present throughput state of the demodulator (operation 64).

In the case where the earth station hub commands state changes based on the voting of plural remote terminals, the remote terminal can periodically send its vote to the earth station hub in the form of a state request indicating the presently desired state determined from the performance prediction algorithm, irrespective of whether the requested state represents a change (operation 66). The periodic state request (vote) will reflect a requested change in state when the performance prediction algorithm determines that there is insufficient or excess power margin in the link.

Optionally, if the system is configured not to require periodic voting from the remote terminal, a state change request can be sent from the remote terminal to the earth station hub in response to the remote LPM determining a state change is desirable (either due to insufficient or excess power margin in the link). If no state change is desired, the remote LPM continues the process of periodically checking the remote demodulator for signal lock and Eb/No (i.e., returns to operation 60), and no message need be sent to the earth station hub.

The performance prediction algorithm is implemented by the remote LPM to determine whether a change of state should be requested to increase or decrease the information throughput. The remote LPM uses Eb/No reports periodically received from remote demodulator to determine the received carrier power to noise power density ratio (C/No). In particular, the received C/No is derived from the Eb/No estimate and the information rate of the current state. In general, the performance prediction algorithm generates an estimated deviation from some specified threshold of performance. The algorithm may use one or more of a number of criteria in the analysis. For example, persistence of recent C/No values relative to a threshold value can be used. With this criterion, a state change request is made when the last N values cross a selected threshold; the threshold values depend upon the current state. Another possible criterion is the current estimate based on recent history of measured C/No relative to a threshold. According to this criterion, a moving average calculation incorporating the last N values is computed, and a request for state change is made when the moving average cross a threshold value; again, the threshold values depend upon the current state. Another criterion for changing the throughput state can be based upon the variance of last N values of C/No. Yet another criterion for changing the state can be based upon the slope of the last N values of C/No, with a positive slope requiring less margin and a negative slope requiring more margin.

Figure 9:
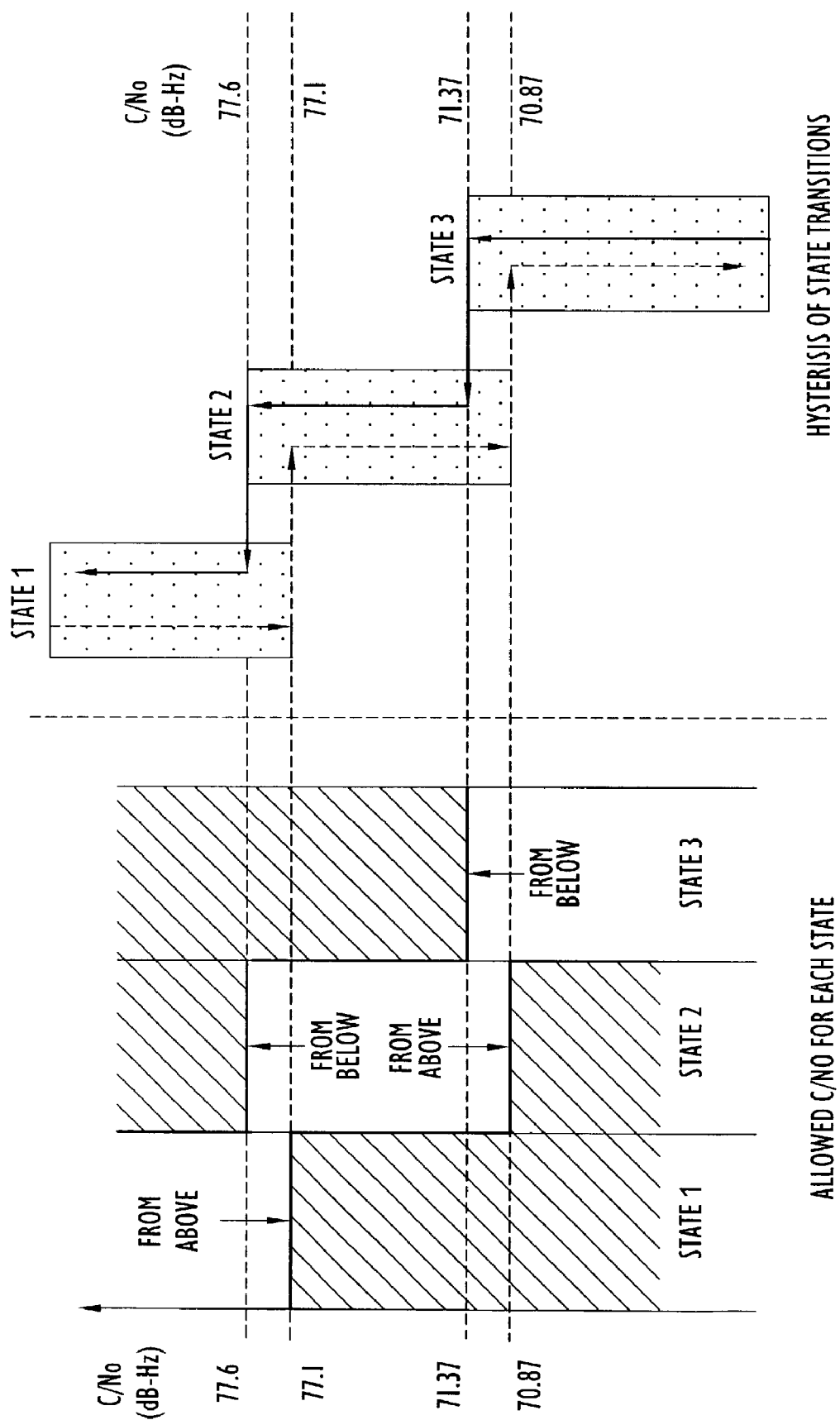
FIG. 9 is a chart illustrating states and transitions as a function of received C/No in accordance with an exemplary embodiment of the present invention.

For purposes of illustration, an example of a performance prediction algorithm which employs a hysterisis technique in state transition determinations is shown in FIG. 9. A typical set of C/No threshold values, which correspond to the example shown in Table 1, is employed in the example. The left portion of the drawing shows the range of C/No values applicable to each of the three system states. The shaded areas indicate values that are not possible for the states. Note that different transition thresholds are employed, depending upon whether the C/No is increasing or decreasing. This approach ensures the stability of system state near the C/No transition values (e.g., not constantly switch back and forth between states).

The right portion of FIG. 9 illustrates the resulting hysterisis that ensures that the states are stable near the threshold boundaries. Specifically, when the remote terminal is in state 1 (i.e., the highest throughput state) and experiences a decrease in the C/No value, the remote LPM requests a transition to the next lowest throughput state (i.e., state 2) when the C/No drops below 77.1 dB-Hz. In contrast, when the remote terminal is in state 2 and experiences an increase in the C/No value, the remote terminal does not request a transition to state 1 until the C/No value exceeds 77.6 dB-Hz. Likewise, when the remote terminal is in state 2 and experiences a decrease in the C/No value, the remote LPM requests a transition to state 3 when the C/No value drops below 70.87 dB-Hz, but when in state 3, the remote terminal does not request a transition to state 2 until the C/No value exceeds 71.37 dB-Hz.

The approach implemented in this exemplary embodiment employs the first of the above-described criterion. In particular, in order to request a transition to a lower throughput state (i.e., from state 1 to state 2 or from state 2 to state 3), the C/No must be below the threshold from above for three consecutive measurements. In order to request a transition to a higher throughput state (i.e., from state 3 to state 2 or from state 2 to state 1), the C/No must be above the threshold from below for four consecutive measurements. It will be understood that the invention is not limited to the particular implementation shown in FIG. 9, and any of a variety of criteria and decision schemes can be used to determine the desired throughput state.

Referring again to FIG. 7, the remote LPM also listens for a state change announcement (SCA) from the hub LPM (operation 68). If the remote LPM receives an SCA (operation 70), the remote LPM changes the configuration of the forward link demodulator (operation 72). If no SCA is received, the remote LPM keeps the forward demodulator in the current state and continues the process of periodically checking the remote demodulator for signal lock and Eb/No (i.e., returns to operation 60).

The above-described functionality is considered normal where the system is able to adapt rapidly enough to keep up with the rain attenuation present in the system. Extreme circumstance may occur in which rain attenuation happens too quickly and the signal is lost without the transmission and reception of an SCA. This case exists when the remote LPM detects that the demodulator has lost lock and an SCA has not been received. Referring again to FIG. 7 at operation 62, if the signal lock status reported to the remote LPM by the remote demodulator indicates a loss of lock, a time out period is initiated (operation 74). By way of non-limiting example, the timeout period can be approximately five seconds. Until the timeout period expires, the remote LPM continues to poll the remote demodulator for signal lock and Eb/No data and evaluate the signal lock status (looping through operations 60 and 62). If signal lock is not reestablished before expiration of the timeout period, the remote LPM sends a state change request to the hub LPM to change to the next lower throughput state, and then reconfigures the demodulator to that requested state and tries to acquire the signal. In particular, in operation 76, if a signal lock loss timeout occurs when the remote terminal is in throughput state 1 (i.e., the highest throughput rate), the remote terminal sends a state request (vote) to the earth station hub requesting the state be set to state 2 (i.e., the next lower state). The remote LPM then reconfigures the demodulator for state 2 (operation 78). Likewise, if a signal lock loss timeout occurs when the remote terminal is in throughput state 2, the remote terminal sends a state request (vote) to the earth station hub requesting the state be set to state 3 (operation 80). The remote LPM then reconfigures the demodulator for state 3 (operation 82). If a signal lock loss timeout occurs when the remote terminal is in the lowest throughput state (in this example, state 3), the remote terminal sends a state request (vote) to the earth station hub requesting the state remain in the lowest throughput state (operation 84); consequently, no reconfiguration of the remote demodulator is required.

After reconfiguring to the next lower throughput state in operation 78 or 82, or remaining in the lowest throughput state, the remote LPM returns to polling the demodulator for signal lock status and Eb/No data (i.e., returns to operation 60). If the remote terminal then acquires the signal in that next lower state, normal processing continues with operation 64 (performance prediction algorithm). As is evident from the flow shown in FIG. 7, if the remote terminal does not reacquire the signal in that next lower state after a specified timeout period, the remote sends a request to the hub LPM to change to an even lower state and tries to acquire at that level, until the lowest throughput state is reached. Thus, the system exhibits robust behavior since the system will gravitate to the state with the highest link margin until forward link communications are established.

Referring to FIGS. 4 and 8, the hub LPM 28 continuously receives votes (messages) from the LPMs in all the remote terminals served by the earth station hub. Hub LPM 28 tallies the votes and determines whether any state changes are required (operation 90). In operation 92, if all the remote terminals are of equal priority, then Hub LPM 28 changes the throughput state of the forward link modulator 42 to accommodate the worst cast remote terminal (i.e., to the lowest requested throughput state). However, if some remote terminal carries only lower priority data, then Hub LPM 28 may opt to change the throughput state of the forward link only in response to remote terminals with higher priority traffic. If hub LPM 28 does decide to change the state of the modems (operation 94), hub LPM 28 commands an SCA to be sent to the remote terminals, which includes the next state and the time epoch for the change (operation 96). Hub LPM 28 then configures hub modulator 42 for the announced state at the defined time epoch (operation 98).

While the voting scheme described herein suggests the information throughput adaptation is applied uniformly to a plurality of remote terminals receiving a broadcast signal on a common forward link, it will be understood that the present invention is capable of performing information throughput adaptation on a link-by-link basis as a function of the instantaneous signal attenuation being experienced on separate communications links. Thus, for example, a remote terminal located in a clear-weather area and receiving signals on one forward link with considerable static power margin can communicate with an earth station hub at a high information throughput rate, while another remote terminal experiencing significant rain fading on a separate forward link can simultaneously communicate with the earth station hub at a lower information throughput rate that accommodates the local rain fade.

As previously mentioned, FIGS. 4–9 illustrate operation of the information throughput adaptation technique of the present invention on the forward link from the earth station hub to a remote terminal. The information throughput adaptation is preferably performed to address at least forward downlink fades and can also be performed to address forward uplink fades. Further, although not shown in FIGS. 4–9, information throughput adaptation can also be performed over the return link from the remote terminal to the earth station hub on either the uplink, downlink or both. In this case, the hub LPM polls the hub demodulator for link performance information in much the same manner as the remote LPM polls the remote demodulator on the forward link. Likewise, on the return link, remote LPM controls the state of the remote modulator in accordance with the data rate modulation and coding scheme in a similar manner to the hub LPM's control of the hub modulator on the forward link.

Information throughput adaptation (ITA) for rain fade mitigation provides numerous benefits for Wideband SATCOM. These benefits include the seamless integration of SATCOM with the terrestrial infrastructure, and constant power and bandwidth at the input to the satellite transponder, which eliminates the need to monitor the transponder operating point in real-time to prevent transponder saturations. Further, the use of link performance management to mitigate downlink rain fades does not rely on power control and eliminates the need for a complex control system overlay, such as network-wide transponder management, and improves the responsiveness of the system to rain fades. ITA also allows dynamic adaptation to downlink rain fades with no increase in the satellite transponder power output, thereby taking advantage of the static margin inherent in commercial SATCOM links that is required to mitigate downlink rain fades. Notably, the uplink and downlink fade adjustment can be performed autonomously to improve dynamic response to signal degradation. For example, if desired, adaptive power control can be used to mitigate uplink fade, while the information throughput techniques of the present invention can be used to mitigate downlink rain fade.

Moreover, ITA can be implemented to manage the user traffic under degraded (reduced information throughput) conditions to ensure that QoS-based SLAs are followed that allow only higher-priority users and service(s) (e.g., time critical, real-time data) to get through the link under such condition, while other lower-priority users and services (e.g., email, FTP) can be delayed. Under such circumstances, the servers must begin to handle the data transmission requests in light of the reduced information throughput and applicable SLA parameters. For example, if the reduced data rate leaves insufficient capacity to transmit all requested information over the link, the earth station hub will prioritize in accordance with the SLA. In essence, the earth station hub will adapt to the "pipe" given to get various message through in the order of what the SLA declares the prioritization to be. In the commercial context, this may mean that a customer paying for a higher level of service continues to get rapid data transmission even during a rain fade, while customers paying for lesser levels of service suffer reduced performance. In the military context, priority may be based on the acceptable latency of certain types of information, the sensitivity of the application, and/or the situation of person sending or receiving the information. In the exemplary embodiment shown in FIGS. 3 and 4, the bandwidth manager 24 is responsible for arbitrating priority among various uses in accordance with the quality of service metrics set forth in service level agreements. Thus, for example, where insufficient throughput is available on the satellite communications link to support all user traffic (e.g., due to rain fade conditions and a corresponding lower-throughput modulation/coding scheme), bandwidth manager 24 assesses signals received via WAN-interface router 26 in accordance with the SLAs and controls the flow of signals to the modem-interface router in accordance with the SLAs and the present throughput rate. Note that the satellite itself simply functions as a transponder receiving signals with a particular RF signature, bandwidth and power. The information throughput adaptation is essentially transparent to the satellite.

The unique aspects of the present invention provide a number of additional benefits. Network management control classically involves monitoring and control of earth terminal devices, such as the status of HPAs, LNAs, modems, etc. In the system of the present invention, which relies on packet-switched technology and is driven by SLA-based QoS, the network management can also include higher level functions such as usage control and billing. The constant envelope modulation eliminates AM/AM and AM/PM effects. A single carrier per transponder (i.e., point-to-multipoint) can operate in the non-linear region of the HPA for more efficient power usage. Multiple carriers per transponder can operate at upper bounds of linearity. The approach of the present invention works for both commercial and military satellite communications.

While the information throughput adaptation technique of the present invention has been described in the context of a network-gateway, earth station hub communicating over one or more duplex SATCOM communications links with a plurality of remote terminals, it will be appreciated that the information throughout adaptation technique of the present invention more generally has applicability in virtually any context in which two (or more) communication devices transmit and receive signals over a duplex SATCOM link with the potential of varying signal attenuation conditions (e.g., a full duplex link between two terminals, a direct or dedicated link between two end-user devices, a link between two gateway devices, etc.). Moreover, while quality of service metrics specified in service level agreements have been described as parameters by which utilization of limited link resources are allocated, it will be understood at the information throughput adaptation technique is applicable for use with a SATCOM link in which any suitable parameters are employed to determine relative priority of users.

It should be noted that a variety of systems have been proposed that involve changing modulation or coding to achieve different information throughput. This is not surprising given that the concept of trading off power versus bandwidth is fundamental to communications theory and has its origins in Shannon's second theorem, which was first published in 1948 and deals with the amount of error-free information one can get through a communications channel. However, for a variety of reasons, the system of the present invention is unique. The system of the present invention is oriented toward a wireless communications channel between two points with a communications satellite serving as a relay. Consequently, the approach employed by the present invention must be sensitive to the fact that the satellite is a shared resource and must be allocated and used by many users. One of the fundamental concepts behind the system of the present invention involves maintaining a constant envelop of power and bandwidth at the interface to the communications satellite. Systems which do not share common resources, such as a satellite transponder, are less concerned with maintaining a constant envelop of power and bandwidth and generally permit changing of the bandwidth and power of the signal.

Rather than provisioning services based on the Quality of Service (QoS) parameter associated with the particular communications channel, the system of the present invention is structured to provision services based on the Service Level Agreement (SLA), which is a provisioning strategy sensitive to the nature of the particular application requesting the service. There can be multiple SLAs within a particular QoS class (e.g., multiple SLAs which are all based on Constant Bit Rate QoS), as well as the same SLA spanning multiple QoS classes. Thus, one of the fundamental concepts of the present invention is service provisioning based on the application requesting the service, rather than the QoS of the communications channel.

Unlike conventional systems oriented toward reduction of throughput to mitigate rain fades, the system of the present invention is oriented toward increase of throughput to take advantage of the static power put into the link to mitigate the rain fade. One of the fundamental concepts of the approach used in the system of the present invention is increased capacity to take advantage of the static margin when it is not required to mitigate the rain attenuation. This concept is directly linked to the aforementioned concept of maintaining constant power and bandwidth of the signal.

Having described preferred embodiments of new and improved methods and apparatus for mitigating rain fading over SATCOM links via information throughput adaptation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of communicating over a satellite communications link using information throughput adaptation to maintain link performance under varying signal attenuation conditions, comprising:
   (a) determining a signal reception parameter indicative of signal attenuation conditions affecting a signal received over the satellite communications link;
   (b) adaptively adjusting an information throughput rate of the signal by selecting a signal modulation scheme and an error correction coding rate of the signal in response to the signal reception parameter, such that the information throughput rate corresponds to the signal attenuation conditions indicated by the signal reception parameter, wherein the satellite communications link includes a static power margin sufficient to maintain communications at a predetermined maximum signal attenuation level using a minimum information throughput rate such that an excess power margin exists in the satellite communications link at lesser signal attenuation levels, wherein said adaptively adjusting comprises adjusting the signal modulation scheme and the error correction coding rate in accordance with the excess power margin in the satellite communications link to increase the information throughput rate with decreasing signal attenuation levels and to enhance the link margin by reducing required energy per bit to noise density power ratio of the link and to reduce data rate carried by the link with increasing signal attenuation levels; and (c) transmitting the signal over the satellite communications link using the selected signal modulation scheme and error correction coding rate.

2. The method of claim 1, wherein the signal modulation scheme and the error correction coding rate are selected such that the signal is transmitted with an adjustable information throughput rate but with a constant RE signature comprised of a constant envelope of power and/or bandwidth.

3. The method of claim 1, wherein the signal modulation scheme and the error correction coding rate are selected such that the signal is transmitted with an adjustable information throughput rate but with bandwidth and power maintained at constant levels.

4. The method of claim 1, wherein the satellite communications link comprises a forward link, including a forward uplink from a first communication device to a communications satellite and a forward downlink from the communications satellite to a second communication device, wherein the information throughput rate is adaptively adjusted to account for varying signal attenuation conditions on at least the forward downlink.

5. The method of claim 4, further comprising:
(d) varying the power of the signal transmitted by the first communication device to account for varying signal attenuation conditions on the forward uplink.

6. The method of claim 4, wherein the information throughput rate is adaptively adjusted to account for varying signal attenuation conditions on the forward uplink.

7. The method of claim 4, wherein the satellite communications link comprises a return link, including a return uplink from the second communication device to the communications satellite and a return downlink from the communications satellite to the first communication device, wherein the information throughput rate is adaptively adjusted to account for varying signal attenuation conditions on the return downlink.

8. The method of claim 7, further comprising:
(d) varying the power of the signal transmitted by the second communication device to account for varying signal attenuation conditions on the return uplink.

9. The method of claim 7, wherein the information throughput rate is adaptively adjusted to account for varying signal attenuation conditions on the return uplink.

10. The method of claim 4, wherein the first communication device is an earth station hub comprising an interface between a terrestrial communications network and the satellite communications link.

11. The method of claim 10, wherein the second communication device is one of a plurality of remote terminals communicating with the earth station hub over the satellite communications link, wherein:
(a) includes each of the remote terminals determining a respective signal reception parameter indicative of signal attenuation conditions on the satellite communications link and supplying a message to the earth station hub indicative of a desired information throughput rate corresponding to the respective signal reception parameter; and
(b) includes the earth station hub selecting an information throughput rate in response to the messages from the remote terminals and sending a reply message to the remote terminals commanding an information throughput rate to be used on the forward link.

12. The method of claim 11, wherein the remote terminals communicate with the earth station hub over separate return links whose respective information throughput rates are separately determined.

13. The method of claim 10, wherein the second communication device is one of a plurality of remote terminals communicating with the earth station hub over separate, respective satellite communications links, wherein:
(a) includes each of the remote terminals determining a respective signal reception parameter indicative of signal attenuation conditions on the respective satellite communications link and supplying a message to the earth station hub indicative of a desired information throughput rate corresponding to the respective signal reception parameter; and
(b) includes the earth station hub separately adjusting information throughput rates of the respective satellite communications links in response to the messages from the remote terminals.

14. The method of claim 1, wherein the signal is transmitted over the satellite communications link using a packetized data transmission protocol.

15. The method of claim 1, wherein the satellite communications link is shared among a plurality of users, wherein a relative priority of the users is determined by service level agreements.

16. The method of claim 15, wherein, as the information throughput rate is decreased in response to increasing signal attenuation on the satellite communications link, lower-priority users experience degraded link performance to a greater extent than higher-priority users.

17. The method of claim 1, wherein the signal is transmitted over the satellite communications link using a Ka-band frequency.

18. The method of claim 1, wherein the signal is transmitted via an uplink to a geostationary satellite and via a downlink from the geostationary satellite.

19. The method of claim 1, wherein the satellite communications link is one of a plurality of satellite communications links supported by a communications satellite, and further comprising allocating a static power margin pool to said plurality of satellite communication links, wherein information throughput adaptation is performed on a link-by-link basis in response to signal attenuation conditions experienced on individual ones of the plurality of satellite communications links.

20. An apparatus for adapting information throughput over a satellite communications link to maintain link performance under varying signal attenuation conditions, comprising:
radio frequency equipment configured to transmit RF signals to a satellite and receive RF signals from a satellite;
a modem coupled to the radio frequency equipment and configured to modulate signals supplied to the radio frequency equipment and demodulate signal received from the radio frequency equipment;
an interface to a communications network, said interface supplying to said modem information signals to be transmitted over the satellite communications link and delivering to the communication network information signals from said modem; and a link performance manager coupled to said modem and configured to adaptively control an information throughput rate of a signal modulated by said modem by selecting a signal modulation scheme and an error correction coding rate of the signal in response to a signal reception parameter indicative of signal attenuation conditions affecting the satellite communications link, wherein the satellite communications link includes a static power margin sufficient to maintain communications at a predetermined maximum signal attenuation level using a minimum information throughput rate such that an excess power margin exists in the satellite communications link at lesser signal attenuation levels, and wherein said link performance manager adaptively adjusts the signal modulation scheme and the error correction coding rate in accordance with an excess power margin in the satellite communications link to increase the information throughput rate with decreasing signal attenuation levels and to enhance the link margin by reducing required energy per bit to noise density power ratio of the link and to reduce data rate carried by the link with increasing signal attenuation levels.

21. The apparatus of claim 20, wherein said link performance manager adaptively selects an information throughput state from a plurality of information throughput states in response to the signal reception parameter, each information throughput state including a distinct combination of a signal modulation scheme and an error correction coding rate resulting in a corresponding information throughput rate, wherein the information throughput state is selected such that the information throughput rate corresponds to the signal attenuation conditions indicated by the signal reception parameter.

22. The apparatus of claim 20, wherein said link performance manager selects the signal modulation scheme and the error correction coding rate such that the signal is transmitted with an adjustable information throughput rate but with a constant RF signature comprised of a constant envelope of power and/or bandwidth.

23. The apparatus of claim 20, wherein said link performance manager selects the signal modulation scheme and the error correction coding rate such that the signal is transmitted with an adjustable information throughput rate but with bandwidth and power maintained at constant levels.

24. The apparatus of claim 20, wherein the satellite communications link comprises a forward link, including a forward uplink from said apparatus to the satellite and a forward downlink from the satellite to a communication device, wherein the link performance manager adaptively adjusts the information throughput rate is to account for varying signal attenuation conditions on at least the forward downlink.

25. The apparatus of claim 24, wherein said link performance manager adjusts the power of the signal transmitted over the forward link to account for varying signal attenuation conditions on the forward uplink.

26. The apparatus of claim 24, wherein said link performance manager adaptively adjusts the information throughput rate to account for varying signal attenuation conditions on the forward uplink.

27. The apparatus of claim 24, wherein the satellite communications link comprises a return link, including a return uplink from the communication device to the satellite and a return downlink from the satellite to said apparatus, wherein said link performance manager adaptively adjusts the information throughput rate to account for varying signal attenuation conditions on the return downlink.

28. The apparatus of claim 27, wherein said link performance manager adaptively adjusts the information throughput rate to account for varying signal attenuation conditions on the return uplink.

29. The apparatus of claim 27, wherein the power of the signal transmitted by the communication device is varied to account for varying signal attenuation conditions on the return uplink.

30. The apparatus of claim 20, wherein said apparatus is an earth station hub comprising an interface between a terrestrial communications network and the satellite communications link.

31. The apparatus of claim 20, wherein the communication device is one of a plurality of remote terminals communicating with said apparatus over the satellite communications link, wherein:
   each of the remote terminals determines a respective signal reception parameter indicative of signal attenuation conditions on the satellite communications link and supplies a message to said earth station hub indicative of a desired information throughput rate corresponding to the respective signal reception parameter; and
   said link performance manager selects an information throughput rate in response to the messages from the remote terminals and sends a reply message to the remote terminals commanding an information throughput rate to be used on the forward link.

32. The apparatus claim 31, wherein said remote terminals communicate with said apparatus over separate return links whose respective information throughput rates are separately determined.

33. The apparatus of claim 20, wherein the communication device is one of a plurality of remote terminals communicating with said apparatus over separate, respective satellite communications links, wherein:
   each of the remote terminals determines a respective signal reception parameter indicative of signal attenuation conditions on the respective satellite communications link and supplies a message to said apparatus indicative of a desired information throughput rate corresponding to the respective signal reception parameter; and
   said apparatus separately adjusts information throughput rates of the respective satellite communications links in response to the messages from the remote terminals.

34. The apparatus of claim 20, wherein said apparatus transmits signals over the satellite communications link using a packetized data transmission protocol.

35. The apparatus of claim 20, wherein the satellite communications link is shared among a plurality of users, wherein said apparatus determines a relative priority of the users by service level agreements.

36. The apparatus of claim 35, wherein lower-priority users experience degraded link performance to a greater extent than higher-priority users as said link performance manager decreases the information throughput rate in response to increasing signal attenuation on the satellite communications link.

37. The apparatus of claim 20, wherein said apparatus transmits the signal over the satellite communications link using a Ka-band frequency.

38. The apparatus of claim 20, wherein the satellite is a geostationary satellite, and said apparatus transmits the signal via an uplink to the geostationary satellite.

39. The apparatus of claim 20, wherein the satellite communications link is one of a plurality of satellite communications links supported by the satellite, wherein said apparatus performs information throughput adaptation on a link-by-link basis in response to signal attenuation conditions experienced on individual satellite communications links.

40. The apparatus of claim 20, wherein said interface comprises:
   a modem interface router coupled to said modem via a high speed serial interface which automatically adapts to data rate changes of said modem;
   a network interface router coupled to the communications network and configured to receive information signals from the communications network and to deliver information signals to the communications network; and
   a bandwidth manager coupled to the modem interface router and the network interface router, said bandwidth manager controlling a flow of information signals between said modem interface router and said network interface router in accordance with a relative priority of the information signals.

41. The apparatus of claim 40, wherein said bandwidth manager manages the information signals in accordance with service level agreements governing a quality of service designated for users communicating over the satellite communications link.

42. A communication device for communicating over a satellite communications link using information throughput adaptation to maintain link performance under varying signal attenuation conditions, comprising:
   radio frequency equipment configured to transmit RF signals to a satellite and receive RF signals from a satellite;
   a modem coupled to the radio frequency equipment and configured to modulate signals supplied to the radio frequency equipment and demodulate signal received from the radio frequency equipment;
   a link performance manager receiving from said modem data relating to a signal received over the satellite communications link and determining a signal reception parameter indicative of signal attenuation conditions affecting the signal, said link performance manager selecting a desired information throughput state from a plurality of information throughput states in response to the signal reception parameter, each information throughput state including a distinct combination of a signal modulation scheme and an error correction coding rate resulting in a corresponding information throughput rate, wherein the desired information throughput state is selected such that the information throughput rate corresponds to the signal attenuation conditions indicated by the signal reception parameter, wherein the satellite communications link includes a static power margin sufficient to maintain communications at a predetermined maximum signal attenuation level using a minimum information throughput rate such that an excess power margin exists in the satellite communications link at lesser signal attenuation levels, and wherein said link performance manager adaptively adjusts the signal modulation scheme and the error correction coding rate in accordance with an excess power margin in the satellite communications link to increase the information throughput rate with decreasing signal attenuation levels and to enhance the link margin by reducing required energy per bit to noise density power ratio of the link and to reduce data rate carried by the link with increasing signal attenuation levels, said link performance manager commanding a message to be sent over the satellite communication link to a source of the signal, requesting the signal to be transmitted using the desired information throughput state; and
   an end-user device coupled to said modem and receiving from said modem information signals transmitted over the satellite communications link.

43. The communication device of claim 42, wherein said link performance manager selects the desired information throughput state such that the signal is transmitted with an adjustable information throughput rate but with a constant RF signature comprised of a constant envelope of power and/or bandwidth.

44. The communication device of claim 42, wherein said link performance manager selects the desired information throughput state such that the signal is transmitted with an adjustable information throughput rate but with bandwidth and power maintained at constant levels.

45. The communication device of claim 42, wherein said communication device receives a state change message over the satellite communication link specifying an information throughput state, wherein said link performance manager controls said modem to operate using the modulation coding scheme and the error correction coding rate of the information throughput state specified by the state change message.

46. The communication device of claim 42, further comprising a router serving as a baseband/switch interface between said modem and said end-user device, said router being coupled to said modem via a high speed serial interface which automatically adapts to data rate changes of said modem.

47. A method of selecting an information throughput state of a signal transmitted over a satellite communications link to maintain link performance under varying signal attenuation conditions via information throughput adaptation, wherein the satellite communications link comprises a forward link, including a forward uplink from a first communication device to a communications satellite and a forward downlink from the communications satellite to a second communication device, wherein the first communication device is an earth station hub comprising an interface between a terrestrial communications network and the satellite communications link, and wherein the second communication device is one of a plurality of remote terminals receiving signals over the satellite communications link, and wherein the information throughput state is adaptively adjusted to account for varying signal attenuation conditions on at least the forward downlink, the method comprising:
   (a) determining a signal reception parameter indicative of signal attenuation conditions affecting a signal received over the satellite communications link, wherein (a) determining comprises each of the remote terminals determining a respective signal reception parameter indicative of signal attenuation conditions on the satellite communications link and supplying a message to the earth station hub indicative of a desired information throughput state corresponding to the respective signal reception parameter; and
   (b) selecting an information throughput state from a plurality of information throughput states in response to the signal reception parameter, each information throughput state including a distinct combination of a signal modulation scheme and an error correction coding rate resulting in a corresponding information throughput rate, wherein the information throughput state is selected such that the information throughput rate corresponds to the signal attenuation conditions indicated by the signal reception parameter, and wherein (b) selecting comprises the earth station hub selecting an information throughput state in response to the messages from the remote terminals and sending a reply message to the remote terminals commanding an information throughput rate to be used on the forward link;

wherein the earth station hub serves a plurality of the remote terminals on the same forward link, and wherein (b) selecting further comprises the earth station hub executing a voting scheme based on the messages received from the plurality of remote terminals and deciding which of the plurality of throughput states to enter based on votes corresponding to the messages received from the plurality of remote terminals.

48. The method of claim 47, further comprising:
(c) including a static power margin in the satellite communications link sufficient to maintain communications at a predetermined maximum signal attenuation level using a lowest information throughput state, such that an excess power margin exists in the satellite communications link at lesser signal attenuation levels, wherein (b) includes selecting the information throughput state in accordance with the excess power margin to increase the information throughput rate with decreasing signal attenuation levels.

49. The method of claim 47, wherein the information throughput state used to transmit the signal is adjustable without altering an RF signature of the signal, the RF signature comprised of a constant envelope of power and/or bandwidth.

50. The method of claim 47, wherein the information throughput state used to transmit the signal is adjustable but a bandwidth and a power of the signal are kept constant.

51. The method of claim 47, further comprising:
(c) varying the power of the signal transmitted by the first communication device to account for varying signal attenuation conditions on the forward uplink.

52. The method of claim 47, wherein the information throughput state is adaptively adjusted to account for varying signal attenuation conditions on the forward uplink.

53. The method of claim 47, wherein the satellite communications link comprises a return link, including a return uplink from the second communication device to the communications satellite and a return downlink from the communications satellite to the first communication device, wherein the information throughput state is adaptively adjusted to account for varying signal attenuation conditions on the return downlink.

54. The method of claim 53, further comprising: (c) varying the power of the signal transmitted by the second communication device to account for varying signal attenuation conditions on the return uplink.

55. The method of claim 53, wherein the information throughput state is adaptively adjusted to account for varying signal attenuation conditions on the return uplink.

56. The method of claim 47 wherein the second communication device determines the signal reception parameter, the method further comprising:
(c) sending a state change request message from the second communication device to the first communication device requesting a change from a current information throughput state to another information throughput state in response to the signal reception parameter having a value corresponding to said another information throughput state.

57. The method of claim 47, wherein the second communication device employs hysterisis in determining transitions between information throughput states as a function of the signal reception parameter.

58. The method of claim 56, further comprising:
(d) sending a state change message from the first communication device to the second communication device commanding a change from the current information throughput state to said another information throughput state in response to the state change request message; and
(e) configuring modems of the first and second communication devices to communicate over the satellite communications link in accordance with the information throughput state indicated by the state change message.

59. The method of claim 58, wherein the second communication device enters a reconfiguration state in response a state change message and enters said another information throughput state upon acquiring the signal transmitted in said another information throughput state.

60. The method of claim 47, wherein the satellite communications link is a shared among a plurality of users, wherein a relative priority of the users is determined by service level agreements.

61. The method of claim 47, wherein (b) selecting comprises the earth station hub evaluating the votes from the plurality of remote terminals and selecting a lowest information throughput state requested from the remote terminals.

62. The method of claim 47, wherein (b) selecting comprises the earth station hub evaluating the votes from the plurality of remote terminals and selecting an information throughput state based on relative priorities of one or more of the remote terminals.

63. The method of claim 62, wherein (b) selecting comprises the earth station hub tallying the votes from the plurality of remote terminals to determine whether any state changes are required, wherein if all of the remote terminals are of equal priority, then the earth station hub selects a throughput state to accommodate the remote terminal with a lowest requested throughput state or if some remote terminal carries lower priority data, then the earth station hub selecting a change to the throughput state only in response to a request from a remote terminal carrying higher priority traffic.

64. The method of claim 63, wherein (b) selecting comprises uniformly selecting a throughput rate to the plurality of remote terminals that receives a broadcast signal from the earth station hub on a common forward link.

65. The method of claim 63, wherein (b) selecting comprises selecting a throughput rate on a link-by-link basis as a function of instantaneous signal attenuation experienced on separate communication links with corresponding remote terminals such that a remote terminal experiencing low attenuation and receiving on one forward link with considerable static power margin communicates with the earth station hub and a relatively high information throughput rate while another remote terminal experiencing higher attenuation on a different forward link simultaneously communicates with the earth station hub at a lower information throughput rate.

66. The method of claim 57, and further comprising the earth station broadcasting a state change announcement message to the plurality of remote terminals, wherein the state change announcement message identifies the state change and time epoch of the state change, and wherein the plurality of remote terminals respond to the state change announcement message and change their signal modulation scheme and/or error correction coding rate based on the state change indicated in the state change announcement message.

67. The method of claim 66, wherein when a remote terminal cannot acquire signal after reconfiguring in response to a state change announcement message from the earth station hub, further comprising the remote terminal sending a state change request to the earth station hub for a next highest state.

68. The method of claim 57, wherein (a) determining comprises each remote terminal periodically polling its demodulator for signal lock and a required energy per bit to noise density power ratio of its link and determines a most desirable throughput rate in accordance with a margin prediction algorithm based on recent history of the bit to noise density power ratio and a present throughput state of the remote terminal.

69. The method of claim 68, wherein (a) determining comprises each remote terminal transmitting a state change request to the earth station hub based on the desired state determined from the prediction algorithm.

70. The method of claim 68, wherein (a) determining comprises each remote terminal computing a carrier power to noise density ratio based on the bit to noise density power ratio and a current throughput state of the remote terminal.

71. The method of claim 70, wherein (a) determining comprises each remote terminal performing one of: comparing the last N values of the carrier power to noise density ratio with a performance threshold that depends on a current throughput state of the remote terminal; computing a moving average based on the last N values of the carrier to noise density ratio and comparing the moving average with a performance threshold that depends on a current throughput state of the remote terminal; computing a variance of the last N values of the carrier to noise density ratio, where a positive variance slopes indicates less margin is required and a negative variance slope indicates more margin is required.

72. The method of claim 70, and further comprising assigning a range of carrier to noise density values to each of the plurality of throughput states, carrier to noise density values not possible for the throughput states, and transition thresholds for transitioning between the throughput states wherein the transition thresholds are dependent on whether the carrier to noise density ratio is increasing or decreasing, wherein (a) determining comprises the plurality of remote terminals comparing the carrier to noise density ratio with a transition threshold depending on a current throughput state of the remote terminal and whether the carrier to noise density ratio is increasing or decreasing relative to a previous value of the carrier to noise density ratio thereby resulting in a hysterisis effect to ensure that the throughput states are stable near the transition thresholds.

* * * * *